(12) United States Patent
Golan et al.

(10) Patent No.: US 7,559,339 B2
(45) Date of Patent: Jul. 14, 2009

(54) SELECTOR FUEL VALVE

(76) Inventors: Iian Z. Golan, 16003 Broadway, Gardena, CA (US) 90248; Daniel Cohen, 16003 Broadway, Gardena, CA (US) 90248

( * ) Notice: Subject to any disclaimer, the term of this patent is extended or adjusted under 35 U.S.C. 154(b) by 0 days.

(21) Appl. No.: 11/974,955

(22) Filed: Oct. 17, 2007

(65) Prior Publication Data

US 2008/0041470 A1 Feb. 21, 2008

Related U.S. Application Data

(62) Division of application No. 11/173,047, filed on Jul. 1, 2005, now Pat. No. 7,299,824.

(60) Provisional application No. 60/585,190, filed on Jul. 1, 2004, provisional application No. 60/602,426, filed on Aug. 17, 2004, provisional application No. 60/662,153, filed on Mar. 15, 2005.

(51) Int. Cl.
*F16K 11/08* (2006.01)

(52) U.S. Cl. .................................. 137/625.41; 251/287

(58) Field of Classification Search ............ 137/625.41, 137/625.46, 614.18, 864, 901; 251/180, 251/181, 182, 185, 287
See application file for complete search history.

(56) References Cited

U.S. PATENT DOCUMENTS

| | | | |
|---|---|---|---|
| 1,992,319 A | 2/1935 | Maggenti | |
| 2,075,458 A | 3/1937 | Parker | |
| 2,209,132 A | 7/1940 | Parker | |
| 2,314,512 A | 3/1943 | Parker | |
| 2,494,633 A * | 1/1950 | Schlicksupp | 137/864 |
| 2,598,605 A | 5/1952 | Robinson | |
| 2,980,142 A * | 4/1961 | Turak | 137/637.3 |
| 3,406,943 A * | 10/1968 | Newell | 251/163 |
| 4,072,291 A | 2/1978 | Adams | |
| 4,250,921 A | 2/1981 | Pingel et al. | |
| 4,275,823 A | 6/1981 | Credle, Jr. | |
| 4,890,644 A | 1/1990 | Hoeptner, III et al. | |
| 4,957,138 A | 9/1990 | Pingel et al. | |
| 5,115,837 A | 5/1992 | Tupper | |

(Continued)

*Primary Examiner*—John Fox
(74) *Attorney, Agent, or Firm*—Robert J. Lauson; Lauson & Tarver LLP

(57) ABSTRACT

A multi-position fuel valve includes a main body having an enclosed chamber with a number of inlet ports and an outlet port and associated seats in the chamber. Disposed inside the chamber is a revolving rotor that is connected to a selector handle located outside the chamber. The rotor provides a possible passageway between each of the inlet ports and the outlet port. The handle can rotate a maximum 180 degrees, and the valve has a pair of inlet sections and three-positions with an "off" position approximately midway between the other two positions. A pair of balls are positioned in the rotor and lodge in the plurality of seats or elsewhere in the chamber. When this occurs a certain portion of the passageway is cut off meaning there is no fluid flow from at least one of inlet ports through the outlet port. A compression spring with opposing ends bearing against the balls maintains the balls lodged in the seats, and releasably fixes the position of the rotor and handle. The valve further has a number of swiveling extension sections connected to the ports for inlet or outlet hoses, such that the valve can be mounted remote from the fuel supply and/or carburetor and connecting hosed routed in most any direction.

8 Claims, 15 Drawing Sheets

U.S. PATENT DOCUMENTS

| | | |
|---|---|---|
| 5,906,224 A | 5/1999 | Tupper et al. |
| 6,129,338 A | 10/2000 | Golan |
| 6,484,746 B2 | 11/2002 | Tine, Jr. |
| 6,820,649 B1 | 11/2004 | Tupper |
| 6,857,661 B2 | 2/2005 | Waters |

\* cited by examiner

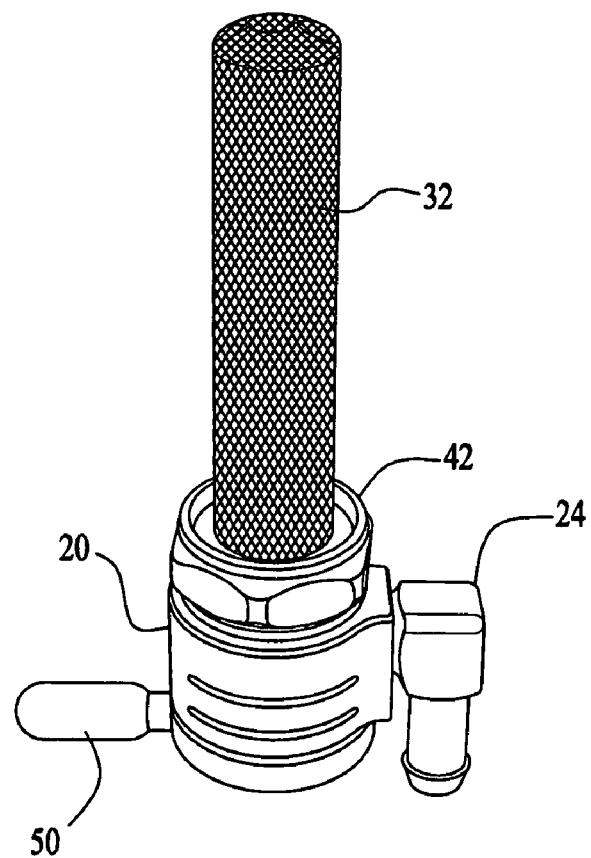
FIG. 1
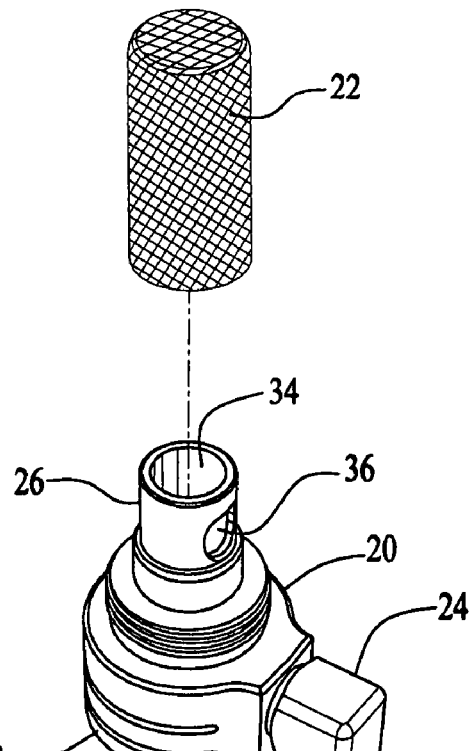
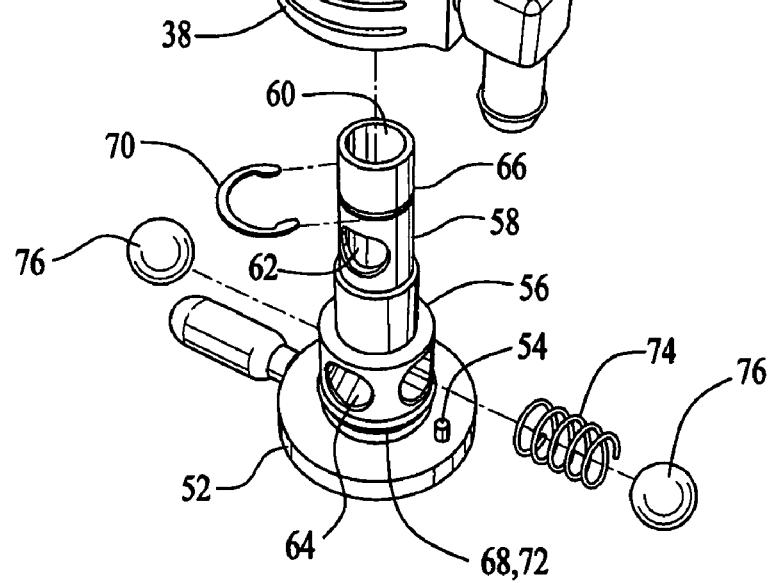
FIG. 2

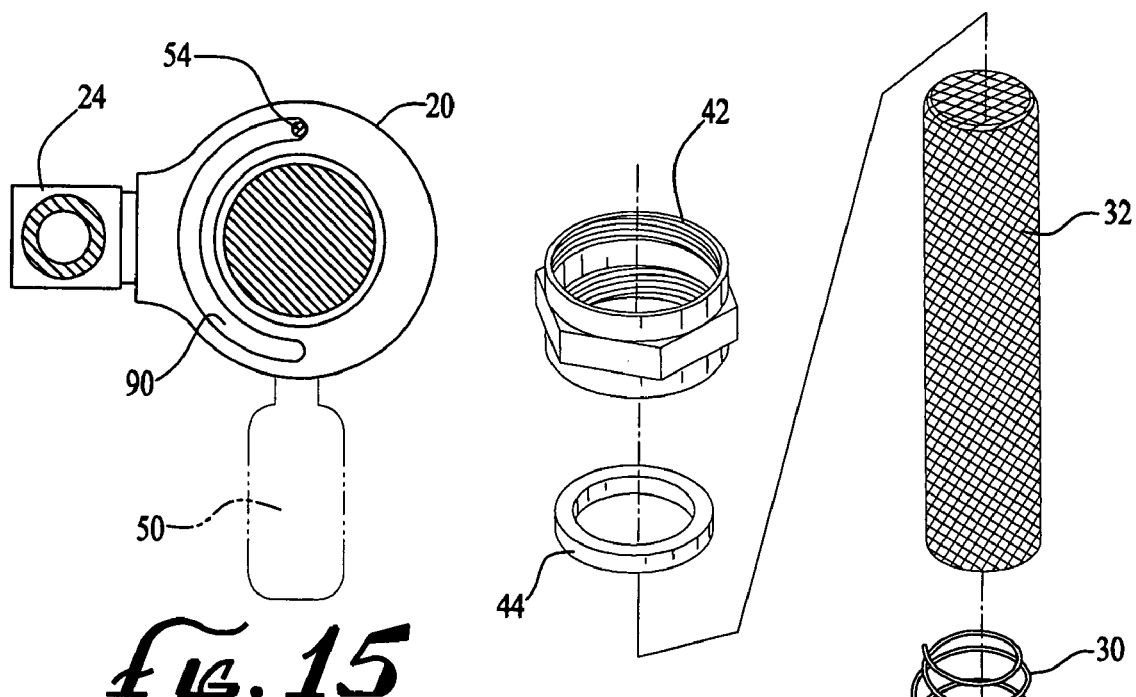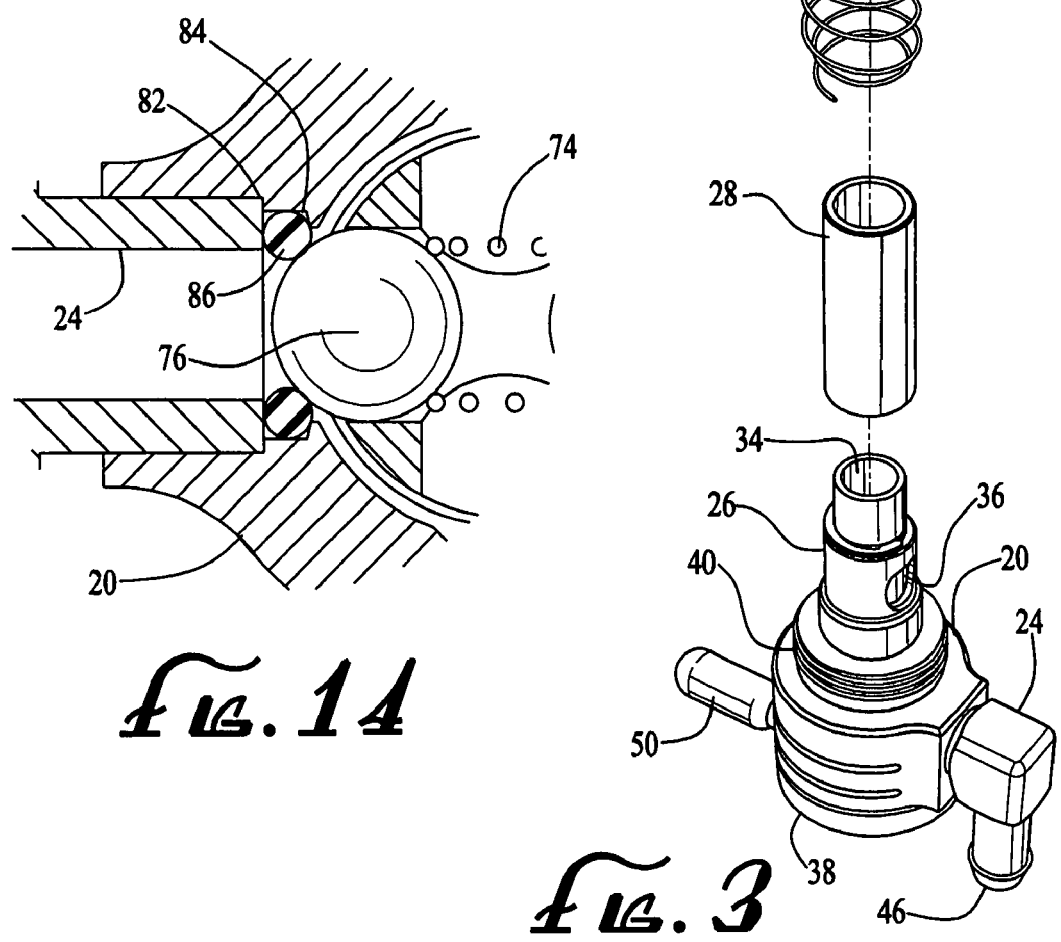

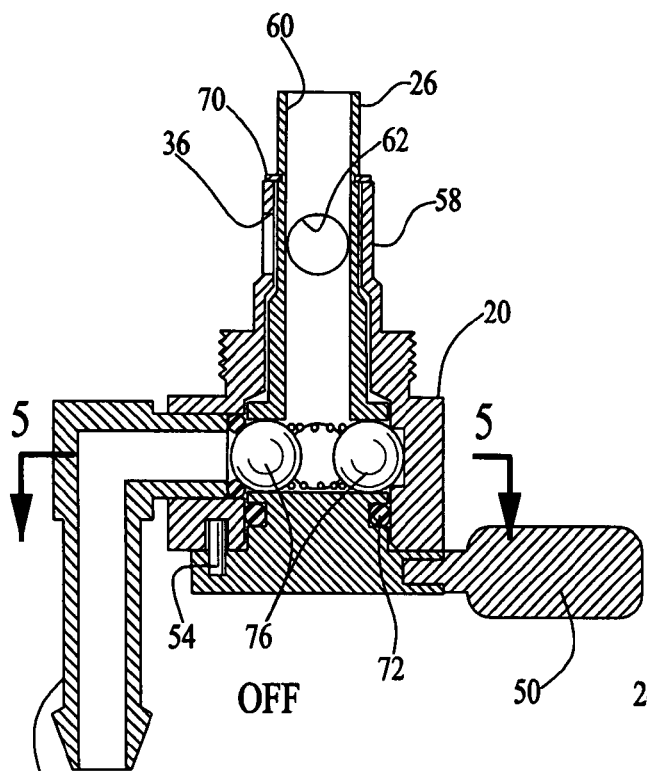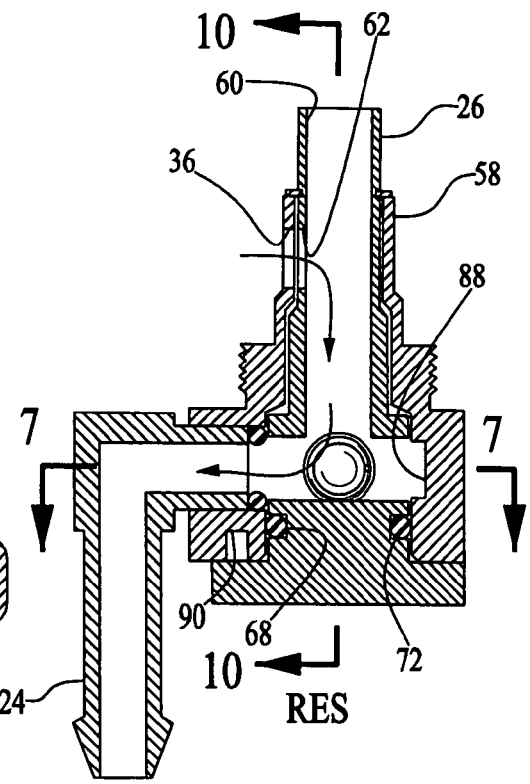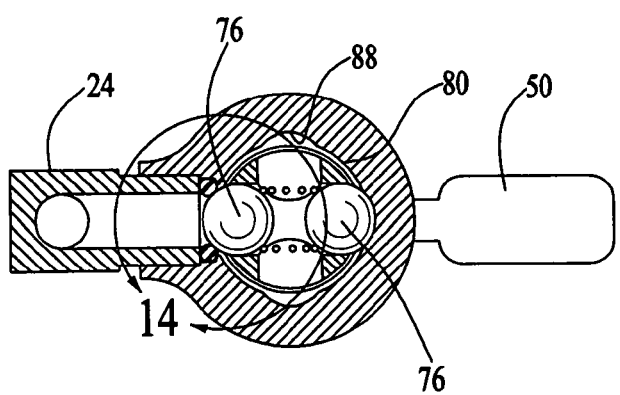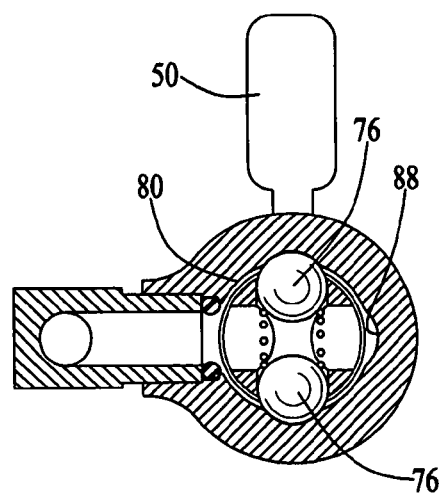

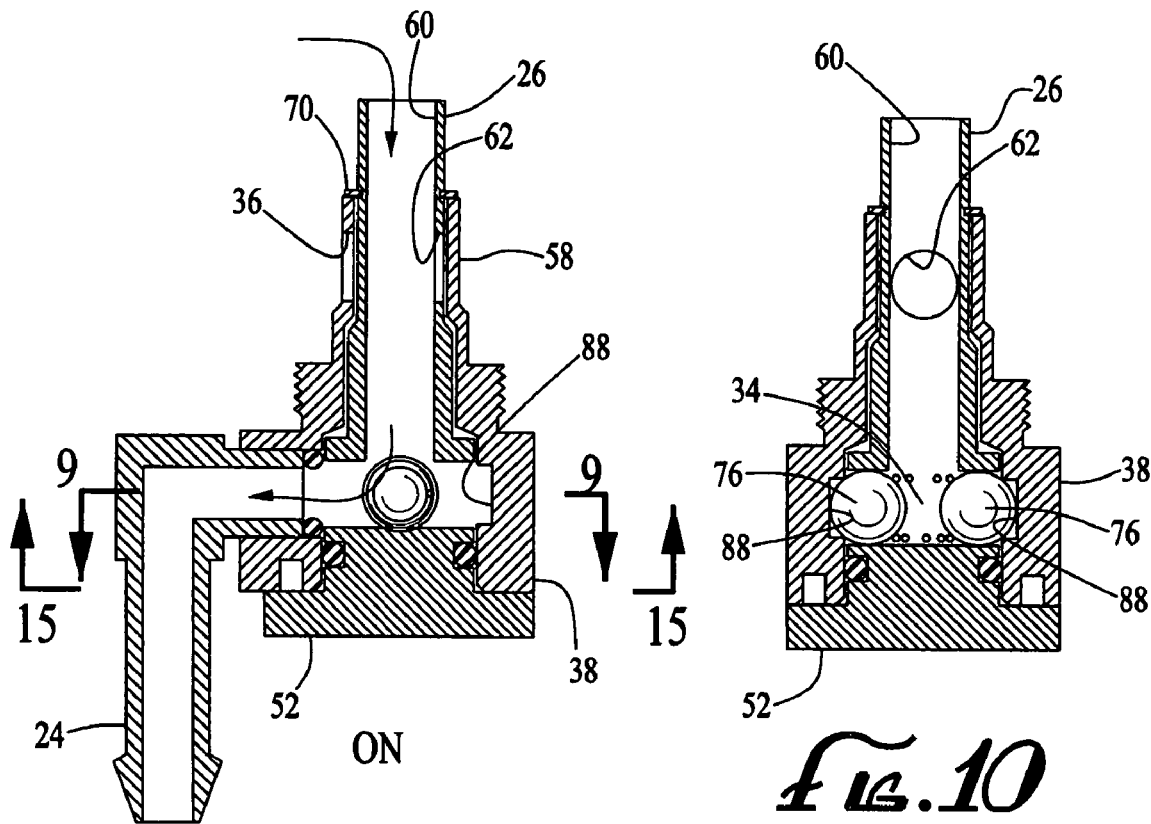
ON
fig.8
fig.10
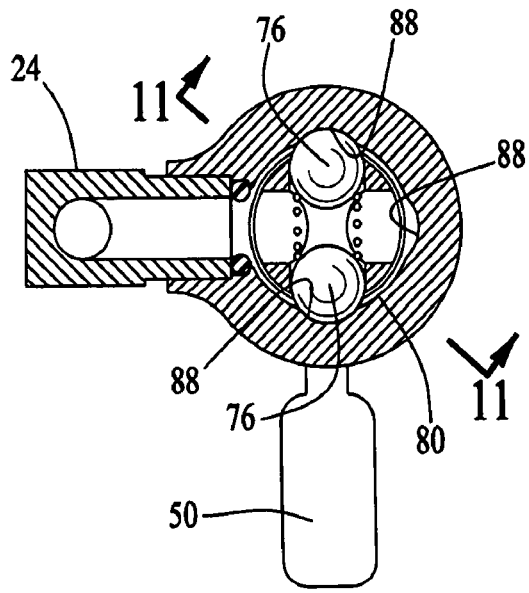
fig.9
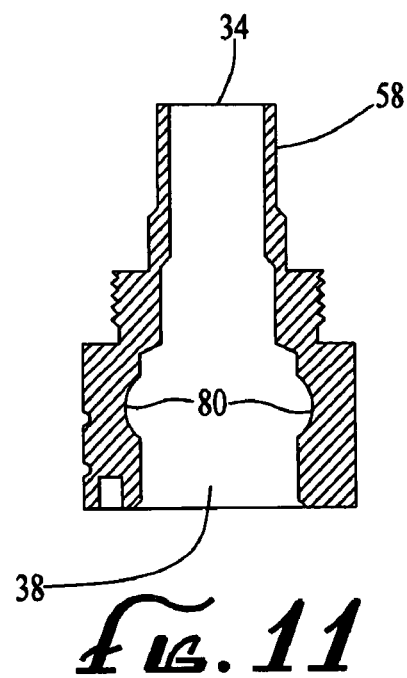
fig.11

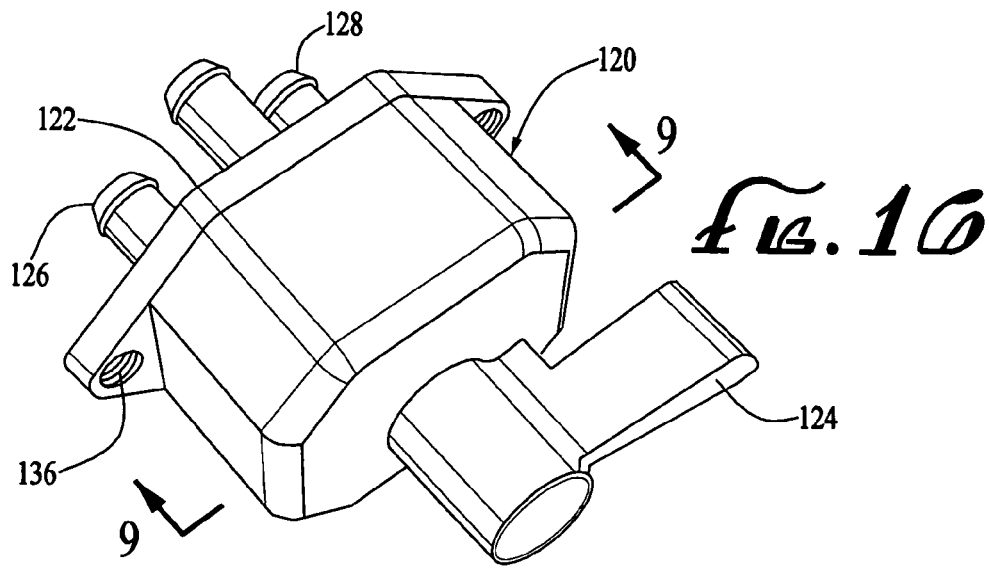
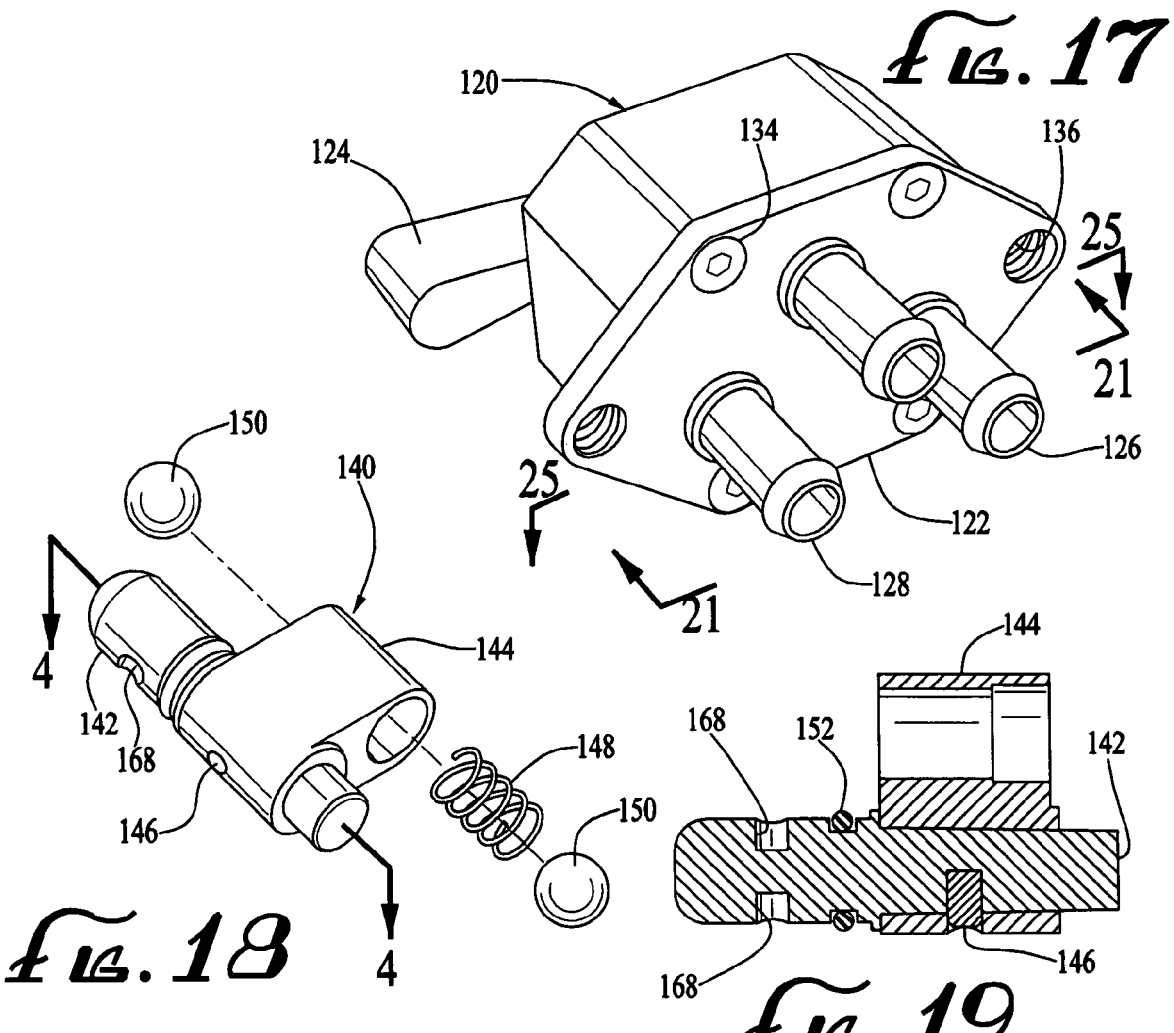

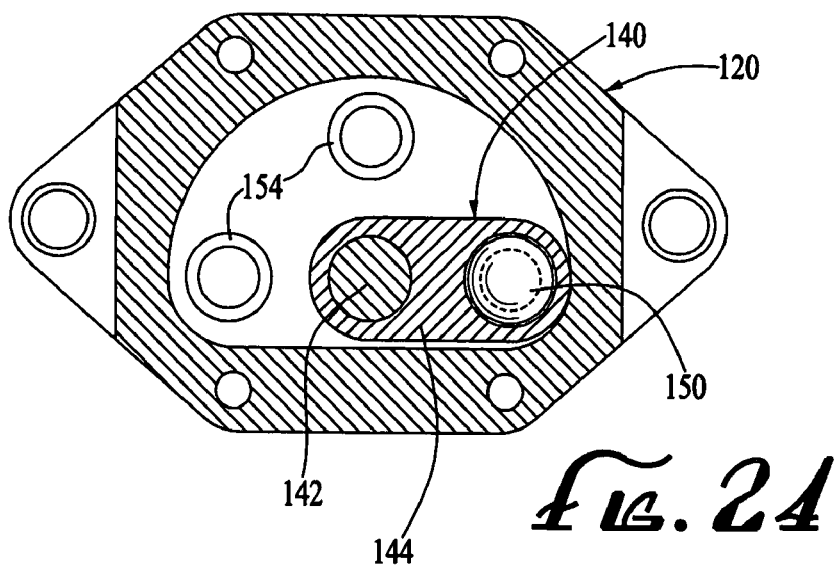
fig. 24
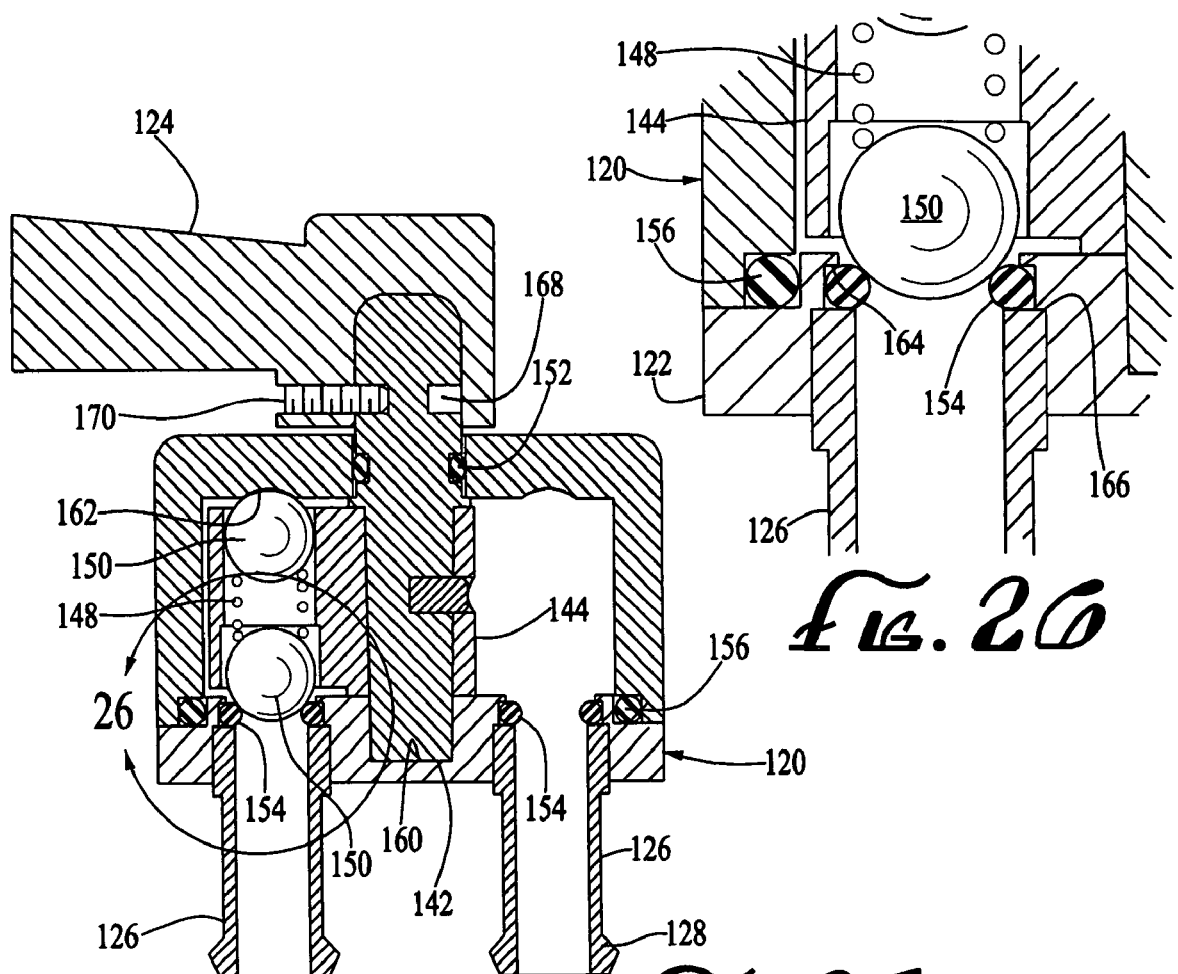
fig. 26
fig. 25

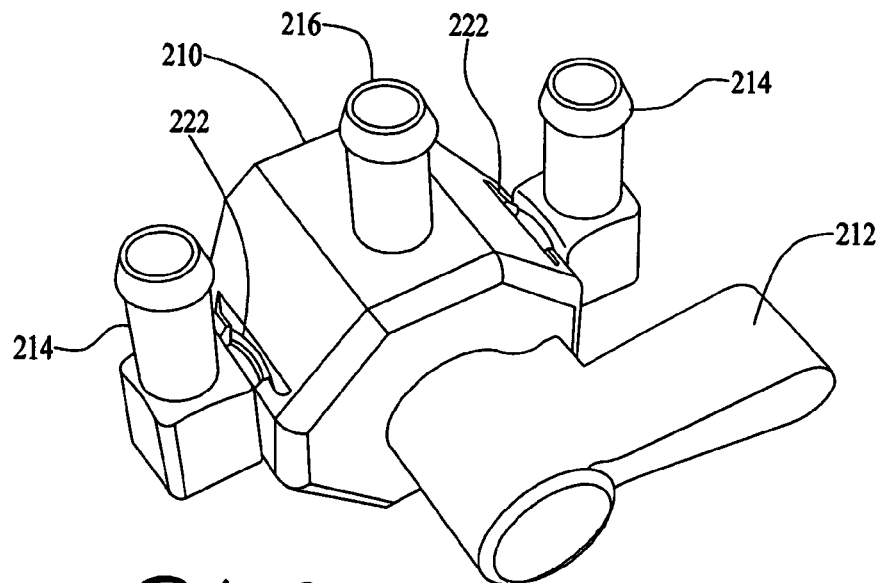
fig. 27
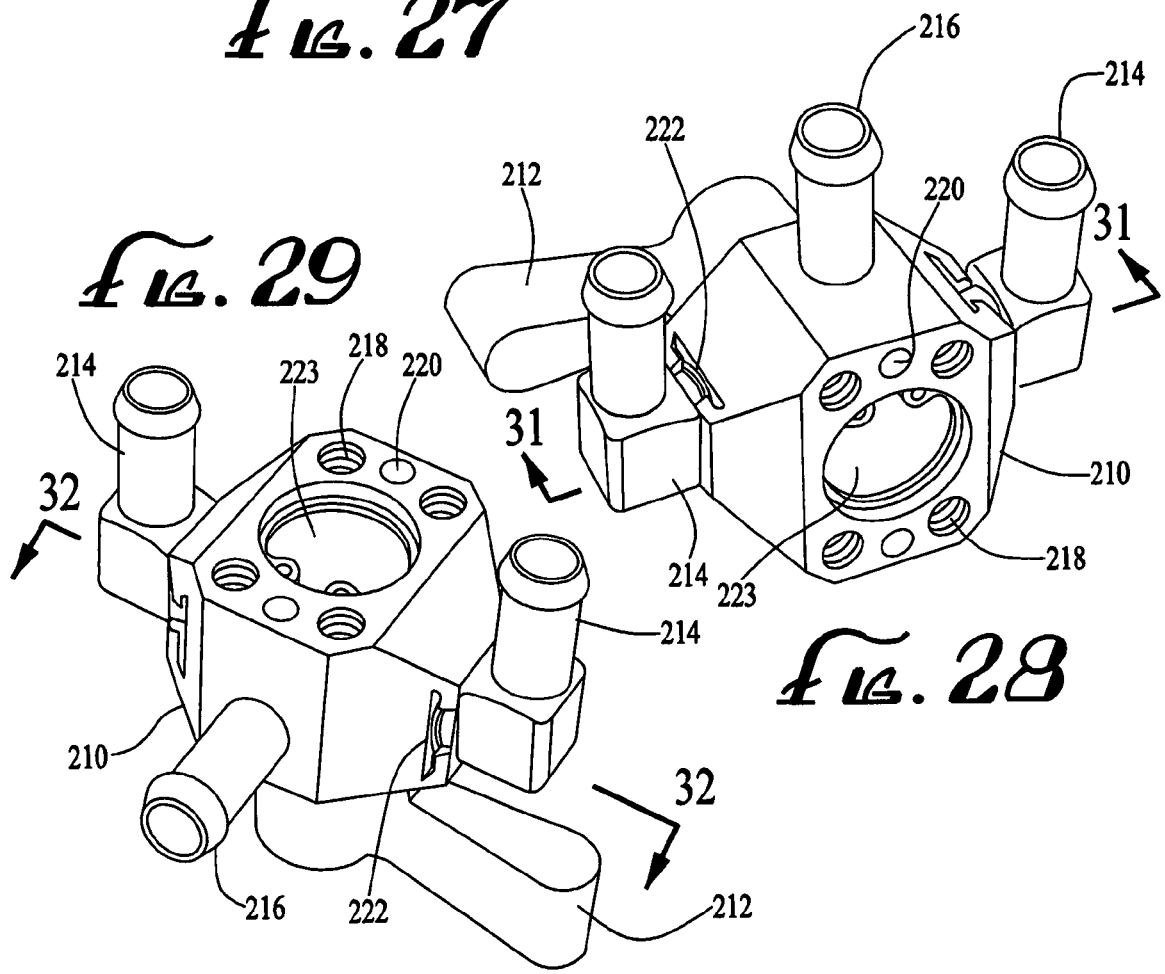
fig. 29
fig. 28

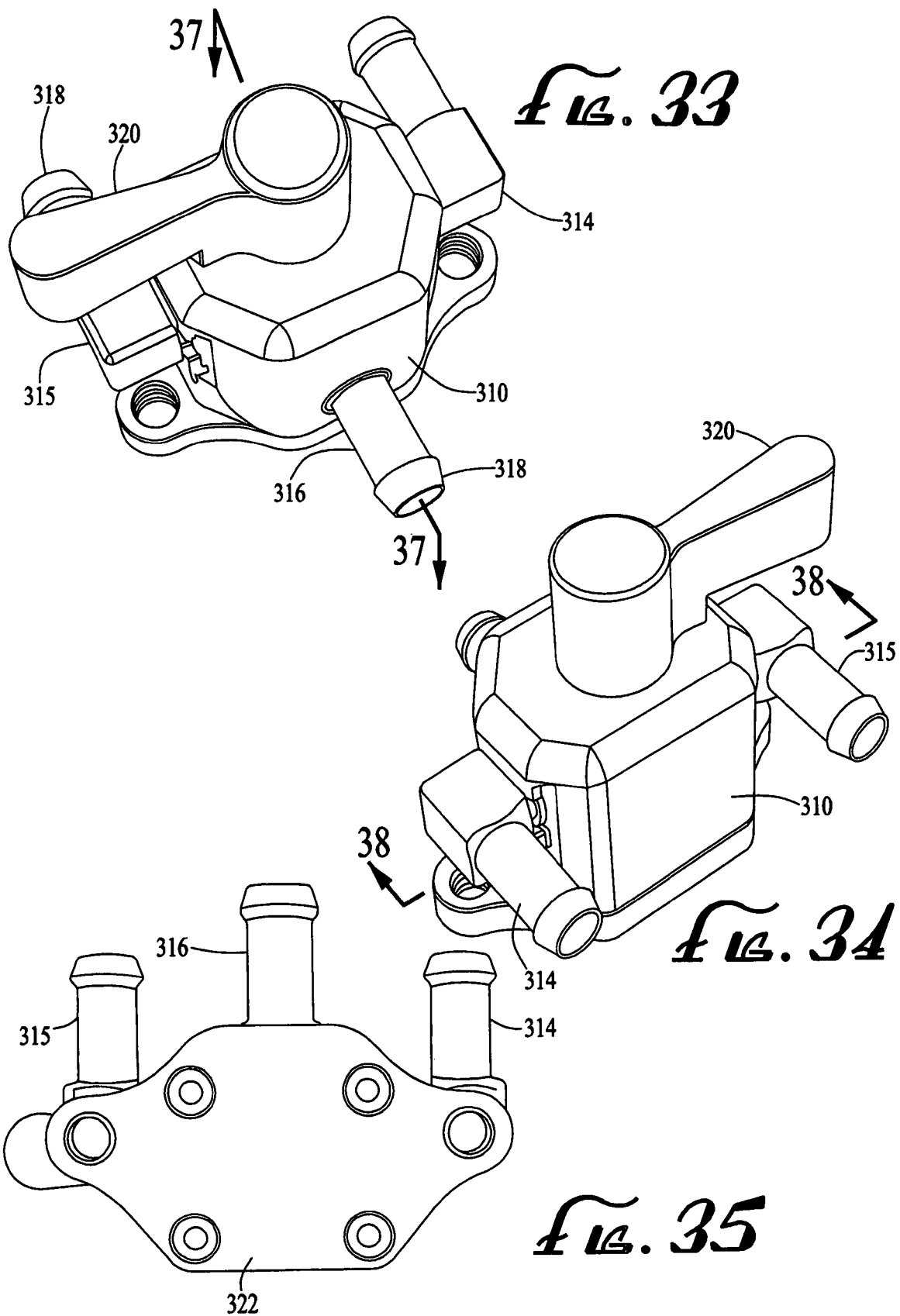

SELECTOR FUEL VALVE

CROSS-REFERENCE TO RELATED DOCUMENTS

This application is a divisional application of Ser. No. 11/173,047 filed Jul. 1, 2005 now U.S. Pat. No. 7,299,824 entitled "Multiple-Mode Fluid Valve," which was based in part on provisional application Ser. No. 60/585,190 filed Jul. 1, 2004 entitled "Motorcycle Fuel System Petcock Valve" and provisional application Ser. Nos. 60/602,426 filed Aug. 17, 2004 and 60/662,153 filed Mar. 15, 2005, both entitled "Remote Fuel Supply Valve For Motorcycles," all of which are incorporated by reference herein.

BACKGROUND OF THE INVENTION

1. Field of the Invention

This present invention is directed to a multi-position fuel line valve particularly adapted for use on a motorcycle including a "chopper."

2. Description of the Related Art

Petcock or selector valves provide a motorcyclist with the ability to switch from an "on" or running position to a "reserve" position (i.e. allowing in fuel from the bottom of the tank (or possibly from a separate tank), typically while the motorcycle is traveling), as well as a fuel line shut "off" position. The Golan U.S. Pat. No. 6,129,338 is illustrative of the state-of-the-art in petcock valves for motorcycles. The device described therein has certain disadvantages, however, in that the polymeric material from which the piston is made is subject to wear over time caused by small particles found in the fuel. Additionally, without establishing close visual contact with the valve it is sometimes difficult to tell exactly what position the valve is in. Petcock valves are usually located on the underside of the gas tank.

Minimalist-style motorcycles became popular in the United States after World War II as bikers removed or shortened fenders and chopped off other unnecessary components to reduce weight and make the bikes look better. This trend accelerated after release of the seminal movie Easy Rider in 1969 as riders wanted a bike like Peter Fonda in the movie. Bikers started raking the front end (decreasing the angle of the fork to the ground), raising the handlebars, decreasing the size of the gas tank and headlight, and the like to achieve the "chopper" look. Again, anything deemed unnecessary was removed or hidden, thereby simplifying and streamlining the appearance of the bike including the underside of the gas tank.

U.S. Pat. No. 6,857,661 issued to Waters discloses a partitioned fuel tank such that upon refueling the user need not switch the valve from "reserve" back to "on" as either side of the lower portion of the tank can operate as the reserve. Instead of an associated valve having a "reserve" position there are a pair of open or "on" positions. In using such a fuel tank it is important that in the "off" position there be no fluid flow between the partitioned parts of the fuel tank. Otherwise, when the user switched between lower portions of the tank the "reserve" fuel might already be largely depleted.

OBJECTS OF THE INVENTION

It is an object of the present invention to provide a multi-position fuel line valve that may be quickly and positively rotated between full on and off positions, and a position for using the reserve fuel supply.

It is a further object of the present invention to provide a valve that is simple, miniature in size, sturdy, and a highly reliable and durable construction.

It is a still further object of the present invention to provide a valve that may be quickly disassembled, cleaned and/or repaired, and easily put back together again.

It is a still further object of the present invention to provide a valve that can be mounted remote from the gas tank to improve the appearance of the motorcycle.

It is a still further object of the present invention to provide a valve with inlets that may vary in position so as to accommodate various routings of fuel lines or hoses.

It is a still further object of the invention to provide a valve that prevents any leakage and stops any flow in the off position.

These and other objects and advantages will become apparent upon reading the following detailed description and upon reference to the accompanying drawings.

SUMMARY OF THE INVENTION

A multi-position fuel valve includes a main body defining an enclosed chamber having a number of inlet ports and an outlet port, each of the ports having an associated seat in the chamber. Disposed inside the chamber is a revolving rotor that is connected to a selector handle located outside the chamber. The rotor is configured to provide a possible passageway between each of the inlet ports and the outlet port, and the selector handle is preferably a lever located for convenient access.

Preferably a pair of balls are positioned in the rotor and sized to lodge in the plurality of seats or elsewhere in the chamber. When this occurs a certain portion of the passageway is cut off meaning there is no fluid flow from at least one of inlet ports through the outlet port. A compression spring with opposing ends bearing against the balls maintains the balls lodged in the seats and fixes the position of the rotor and handle.

The main body has a number of detents such that a substantial force is required to rotate the selector handle and revolve the rotor inside the chamber and move the balls between the seats. Preferably, the chamber has a circumferential groove in which the balls travel as being revolved between the seats. Further, the seats are preferably configured to lie below the circumferential groove such that the compression spring expands forcing the ball into the seat, and then compresses as the handle is rotated and rotor revolved thereby forcing the ball out of the seat and into the circumferential groove.

The valve further includes a number of extension sections connected to the ports for inlet or outlet hoses such that the valve can be mounted remote from the fuel supply and/or carburetor. Preferably the extension sections swivels relative the chamber to provide additional flexibility for routing of fluid lines to the valve. Each swiveling extension section has a tubular portion sized for going into one of the ports of the chamber and has a circumferential slot for housing a locking ring. The main body of the valve has a corresponding slot proximate the port for receiving the locking ring such that the extension section is retained to the valve. Further, each extension tubular portion preferably has a circumferential slot that accepts an o-ring for providing an effective seal.

In operation, rotation of the selector handle causes the rotor and the balls and the spring to revolve inside the chamber between the plurality of seats. This provides control of the fluid flow between the plurality of inlet ports and the outlet port. One or more o-rings disposed in one or more of the seats in the chamber provide leak-proof seals.

Preferably the valve has a pair of inlet sections and three-positions, with an "off" position approximately midway between the other two positions. Preferably the rotor is configured such that the handle can rotate a maximum 180 degrees. This may be accomplished by the rotor having a protruding stop that rides in a semi-circular slot in the main body. The rotor is preferably made of a metallic material.

Preferably the valve is configured such that in an "off" position no fluid flow is possible between the inlet ports. This may be accomplished with the rotor having an upper passageway for receiving fluid through the inlet ports, the passageway extending inside the rotor to a lower passageway for passing fluid out the outlet port. The passageway is laid out such that when the rotor is revolved and the fluid flow is cut off to the outlet port, and the upper passageway is not aligned with any of the inlet ports.

BRIEF DESCRIPTION OF THE SEVERAL VIEWS OF THE DRAWINGS

FIG. 1 is an overall perspective view of an overall assembled view of a first-preferred embodiment valve (with an inlet extension).

FIG. 2 is a perspective view of the first-preferred embodiment (without an inlet extension) with the lower valve portion disassembled.

FIG. 3 is a perspective view of the first-preferred embodiment with the upper inlet portion and extension disassembled.

FIG. 4 is a cross-sectional view of the first-preferred embodiment with the valve in the "off" position.

FIG. 5 is another cross-sectional view of the first-preferred embodiment with the valve in the "off" position and the ball seated against the o-ring seal.

FIG. 6 is a cross-sectional view of the first-preferred embodiment with the valve in the "reserve" position and arrows indicating the possible fuel flow.

FIG. 7 is another cross-sectional view of the first-preferred embodiment with the valve in the "reserve" position.

FIG. 8 is a cross-sectional view of the first-preferred embodiment with the valve in the "on" position and arrows indicating the possible fuel flow.

FIG. 9 is another cross-sectional view of the first-preferred embodiment with the valve in the "on" position.

FIG. 10 is another cross-sectional view of the first-preferred embodiment.

FIG. 11 is a cross-sectional view of the housing of the first-preferred embodiment.

FIG. 14 is an enlarged cross-sectional view of the first-preferred embodiment showing the outlet o-ring seal.

FIG. 15 is a bottom view of the housing of the first-preferred embodiment showing a semicircular groove, the position of the handle shown in phantom lines.

FIG. 16 is a perspective view of a second-preferred embodiment selector valve of the present invention.

FIG. 17 is a reverse perspective view of the second-preferred embodiment.

FIG. 18 is a perspective view of the valve stem or rotor of the second-preferred embodiment.

FIG. 19 is a cross-sectional view through the second-preferred embodiment valve stem or rotor.

FIG. 24 is a cross-sectional view through the second-preferred embodiment valve.

FIG. 25 is another cross-sectional view through the second-preferred embodiment.

FIG. 26 is an enlarged view of a portion of FIG. 25.

FIG. 27 is a perspective view of a third-preferred embodiment valve of the present invention.

FIG. 28 is another perspective view of the third-preferred embodiment valve.

FIG. 29 is a yet another perspective view of the third-preferred embodiment.

FIG. 33 is a top perspective view of the fourth-preferred embodiment valve of the present invention.

FIG. 34 is reverse angle top perspective view of the fourth embodiment valve.

FIG. 35 is a bottom view of the fourth embodiment with the inlet sections 314, 315 swiveled 180 degrees.

Figure 12:
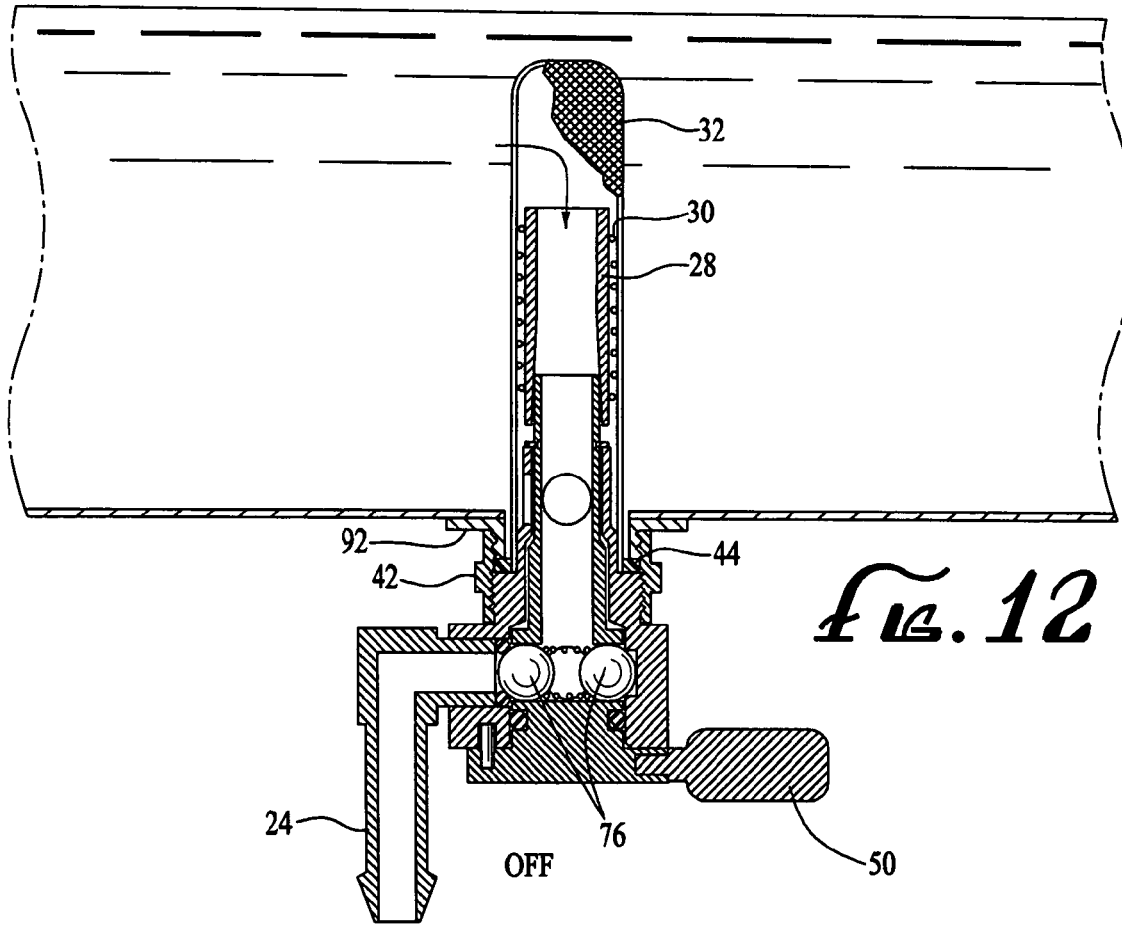
FIG. 12 is a cross sectional view of the first-preferred embodiment (with the inlet extension) as installed in a fuel tank.

LISTING OF REFERENCE NUMERALS FOR FIRST-PREFERRED EMBODIMENT main body or housing 20
screen filter 22
outlet section 24
inlet section 26
inlet extension 28
large spring 30
elongate screen filter 32
inlet port 34
reserve port 36
main chamber or cavity 38
left hand threads 40
nut 42
washer 44
nipple 46
selector handle 50
flange or end cap 52
pin 54 rotary piston 56
inlet neck 58
inlet port 60
reserve port 62
outlet ports 64
grooves 66, 68
snap lock ring 70
o-ring 72
small spring 74
ball 76
circumferential slot 80
shoulders or steps 82, 84
o-ring 86
vertical slot 88
semi-circular slot 90
mounting bracket 92

LISTING OF REFERENCE NUMERALS FOR
SECOND-PREFERRED EMBODIMENT main body or housing 120
end cap 122
selector handle 124
port 126
nipple 128
fastener 134
fastener hole 136
rotary valve stem 140
pivot pin 142
swing arm 144
retaining pin 146
compression spring 148
ball 150
o-ring 152
o-ring 154
large o-ring 156
raised land 158
cavity 160
hole 161
indentation 162
shoulder 164
stop 166
fastener hole 168
fastener 170

LISTING OF REFERENCE NUMERALS FOR
THIRD-PREFERRED EMBODIMENT main body or housing 210
handle 212
inlet sections 214
outlet section 216
threaded holes 218
tooling holes 220
housing slots 222
large opening 223
rotary piston 224
neck portion 226
top hole 228
fastener hole 230
fastener 232
circumferential groove 234
o-ring 236
middle portion 238
ports 240
ball port 241
small spring 242 ball 244
pivot pin 246
end cap 248
cavity 250
circumferential groove 252
o-ring 254
locking ring 256
circumferential groves 258
o-rings 260
lock ring 262
o-rings 264

LISTING OF REFERENCE NUMERALS FOR
FOURTH-PREFERRED EMBODIMENT main body or housing 310
chamber or inner cavity 312
inlet sections 314, 315
outlet section 316.
nipples 318
selector or lever handle 320
end cover 322
two-stage rotor 324
rotor upper portion 326
rotor lower portion 328
rotor cap 330
circumferential groove 332
valve seats 334
protruding pins 336
pin holes 338
conventional fasteners 340
fastener holes 342, 344
protruding stop 346
end cover slot 348
handle opening 350
conventional fastener 352
threaded holes 354
fastener hole 356
circumferential groove 358
o-rings 360, 362
recessed area 364
spring washer 366
protruding pin 368
pin hole 370
pivot pin 372
end cover opening 374
mounting holes 376
stepped hole 378
tubular portion 380
circumferential grooves 382
o-rings 384
locking ring 386
side slot 388
passageway 390
balls 392
compression spring 394
curved vertical slot 396
o-ring 398

DESCRIPTION OF THE PREFERRED
EMBODIMENTS

The detailed descriptions set forth below in connection with the appended drawings are intended as a description of presently-preferred embodiments of the invention, and is not intended to represent the only forms in which the present invention may be constructed and/or utilized. The descriptions set forth the structure and the sequence of steps for constructing and operating the invention in connection with the illustrated embodiments. It is to be understood, however, that the same or equivalent structures and steps may be accomplished by different embodiments that are also intended to be encompassed within the spirit and scope of the invention.

Referring to FIGS. 1-13, the first-preferred embodiment of the present invention will be described. Primarily referring to FIGS. 2, 3, the present embodiment petcock valve includes a main body or housing 20 including a screen filter 22, an inlet section 26, and an outlet section 24 extending orthogonally from the main body or housing 20, all with generally hollowed-out interiors. Optionally, the present embodiment may include an inlet extension 28, a large spring 30 and elongate screen filter 32. The inlet section 26 includes an inlet port 34 and a reserve port 36. Inside the main body or housing 20 is a main chamber or cavity 38, the shape and configuration of which will be described in detail below. The top of the outside of the main body or housing 20 includes left hand threads 40 that engage the left hand threads (not shown) found on the bottom inside of a nut 42, and in combination with a washer 44 secure the upper part of the petcock assembly together. The outlet portion 24 includes a nipple 46 that engages a conventional 5/16 inch diameter hose (not shown) to the motorcycle engine. The outlet portion 24 is available in other nipple 46 sizes for larger or smaller diameter hoses. Also, rather than the right angle, 90 degree outlet port 24, a straight outlet port (not shown) is also available.

Primarily referring to FIG. 2, the lower part of the petcock assembly may be described. A generally cylindrically-shaped selector handle 50 with rounded edges projects from an end flange or cap 52. On the upper surface of the end flange 52 is a small pin 54, the function of which will be addressed below. Above the end cap 52 is a piston 56 of varying diameters and having a number of orifices or ports. The piston or rotor 56 is generally a cylindrical tube open on one end, with an inlet neck 58, an inlet port 60, a reserve port 62 and four (4) outlet ports 64. Just above the reserve inlet port 60 is a groove for a snap lock ring 70, and just below the outlet ports 64 is a groove 68 for an o-ring 72. A small spring 74 is seated inside the piston or rotor 56 between two of the outlet ports 64 and a pair of balls 76 are seated in those outlet ports and inside the main chamber or cavity 38.

Now also referring to FIGS. 4-10, the petcock valve may be further described. FIGS. 4, 5 show the petcock valve in the "off" position, with the handle 50 rotated 180 degrees relative the outlet section 24, such that the balls 76 are also in that line. As best shown in FIG. 14, the main body or housing 20 is made with a pair of shoulders or steps 82, 84 to act as a stop for the location of the outlet section 26 and such that a space is created to retain an o-ring 86. When the handle 50 and piston or rotor 56 are in this "off" position the balls 76 are pushed apart by the spring 74 such that the one ball 76 seats in the outlet port 64 and against the o-ring 86, creating a highly effective seal and preventing any fuel from passing. Also note the o-ring 72 that prevents fuel from passing between the piston or rotor 56 and main body of housing 20 (See FIG. 4).

FIGS. 6, 7 show the petcock valve in the "reserve" position with the selector handle 50 rotated 90 degrees counterclockwise from the "off" position. As shown by the arrows, fuel may flow through the aligned reserve ports 36, 62, into the inlet neck 58 and through the outlet port 64, and into the outlet section 24 and the attached hose (not shown). Finally, FIGS. 8, 9 show the valve in the "on" position with the selector handle 50 rotated clockwise. Again as shown by the arrows, the fuel may flow in through the inlet port 60 and into the inlet neck 58 and through the outlet port 64 into the outlet section 24 and out.

Now also referring to FIGS. 10, 11, other details of the main chamber or cavity 34 can be described. It is made with a circumferential, curved slot 80 for encapsulating the balls 70 inside the main body or housing 20 and generally inside the two select outlet ports 64. Further, as best shown in FIG. 6, the outlet section 24 is in fluid communication with the main chamber or cavity 34 by a hole bored therein. This hole also allows the ball 76 to travel further outboard under forces of the spring 74 and seat against the o-ring 86 as described above in conjunction with FIG. 14.

Additionally, around the inside of the main chamber or cavity 34, at 90, 180 and 270 degrees from the outlet section 24, machined into the circumferential slot 80 are three vertical, curved slots 88. The curve of the slots 88 approximately matches the curve of the balls 76, being greater than the curve of the slot 80. These slots 88 similarly allow the balls 76 to move slightly outboard at these positions, which tends to retain the valve in those positions until sufficient rotary force is applied to the selector handle 50 to force the balls 76 inward and into the circumferential slot 80. Additionally, as the selector handle 50 is being rotated between the "on", "off" and "reserve" positions, the user feels in his fingers and hears a "click" sound as the balls 76 jump into the vertical slots 88 and/or against the o-ring 86.

Referring to FIG. 15, yet another feature of the first-preferred embodiment of the present invention may be described. On the bottom side of the main body or housing 20 is a semi-circular slot 90. This slot 90 is sized to receive the fixed, small pin 54 protruding from the top side of the flange 52, that serves to limit rotation of the valve and handle 50 to 180 degrees. Thus, when the user rotates the valve all the way counterclockwise it will be in the "reserve" position, whereas when rotated all the way clockwise it will be in the "on" position.

Figure 13:
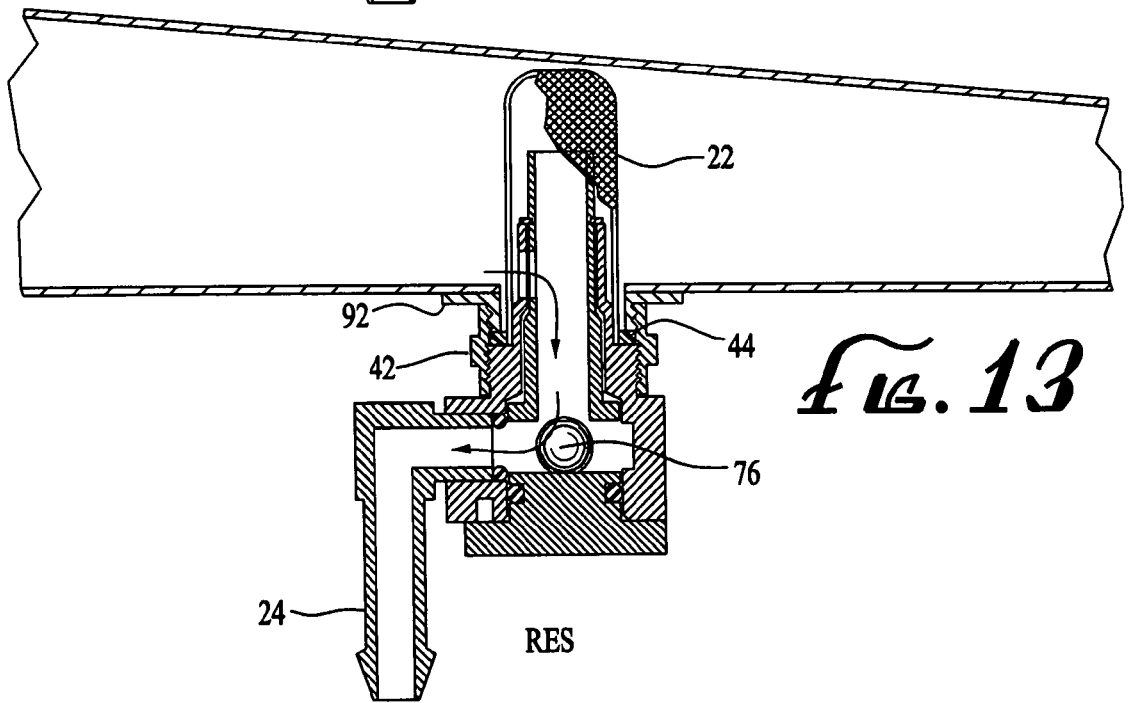
FIG. 13 is a cross sectional view of the first-preferred embodiment (without the inlet extension) as installed in a narrow aft portion of a fuel tank.

Referring to FIGS. 12, 13, the first-preferred embodiment of the present invention are shown installed in a pair of fuel tanks, in FIG. 12 into a larger tank or deeper section of the tank, and in FIG. 13 into a smaller tank or shallower section of the tank. On the top inside portion of the nut 42 are right-hand threads which engage a mounting bracket 92 the bottom of the fuel tank. The plastic washer 44 serves to prevent fuel from leaking outside the valve. The overall height of the petcock valve without the inlet extension 28 and not counting the screen filter 22 or 32 is less than about 2.25 inches.

The screen filter 22, 32 material is preferably a metal or metal alloy suitable for use in gasoline or other fuel environments. The mesh size of the screen 22, 32 should be chosen for the particular application, to provide the filtering function without overly restricting the flow through of fuel from the tank into the engine, e.g. providing at least 70 ounces per minute. The other parts of the petcock valve are machined from 360 solid brass and show-chromed for a lifetime shiny finish. The o-ring 86 provides a no leak seal through the outlet 24 of the petcock valve, while the o-ring 72 prevents fuel from leaking out the bottom.

The petcock valve is also easily uninstalled and disassembled for occasional maintenance. The nut 42 is loosened and the petcock valve removed from the fuel tank, such that the screen filter 22, 32 can be removed and cleaned. Then, if necessary, to service the o-rings 72, 86, the snap lock ring 70 is removed from the inlet neck 58 such that the piston 58 can be pulled through the inlet port 34 and separated from the main body or housing 20. This will also release the balls 74 and spring 76 and thus care should be taken that those parts are not lost upon disassembly. The petcock valve is reassembled and reinstalled by reversing the above steps.

Referring to FIGS. 16-26, the second-preferred embodiment of the present invention will be described. First primarily referring to FIGS. 16, 17, the second-embodiment petcock valve includes a main body or housing 120, an end cap 122 and a selector handle 124. The end cap 122 includes three (3) ports 126, two outlet sections and an inlet section, each having a nipple 128 sized to engage a conventional 5/16 inch diameter hose (not shown) to the gas tank(s) or carburetor. The ports 126 (or inlet/outlet sections) are available in other sizes as needed, and a 90 degrees port is also available in addition to the straight line ports 126 shown. Four (4) conventional fasteners 134 hold the end cap 122 onto the main body or housing 120.

Figure 20:
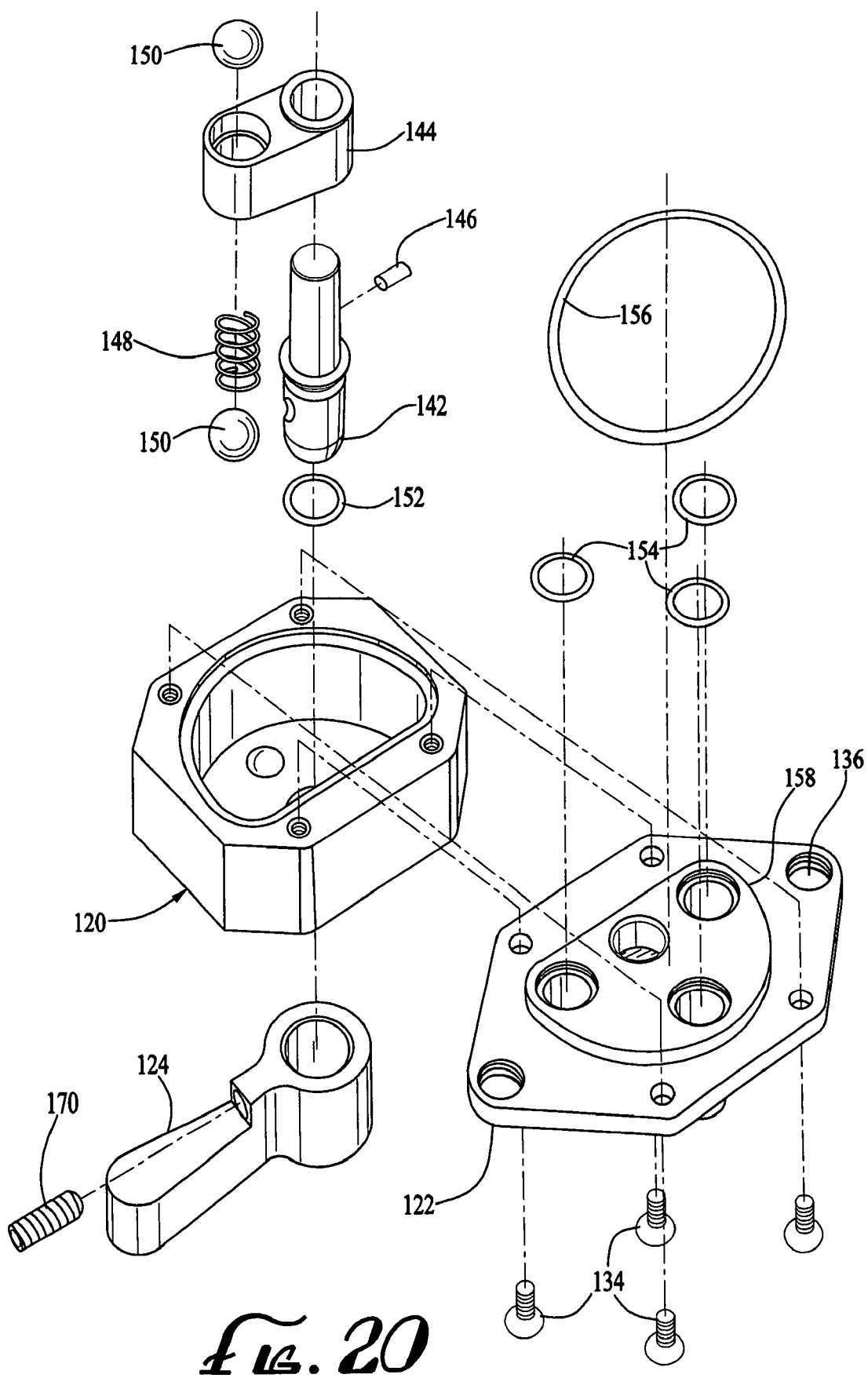
FIG. 20 is an exploded, disassembled view of the parts and components of the second-preferred embodiment valve.

Now also referring to FIGS. 18-20, further parts and components of the second-preferred embodiment valve may be described. Inside the hollowed-out main body or housing 120 is a valve stem or rotor assembly 140 including a pivot pin 142 and a swing arm 144. As best shown in FIG. 19, the pivot pin 142 and swing arm 144 are secured together by a retaining pin 146 so that they cannot rotate relative one another. The swing arm 144 has a longitudinal through hole that houses a compression spring 148 and a pair of balls 150 at each end. Still further included are a number of o-rings, 152 in a circumferential groove in the pivot pin 142, and 154 seated in the three (3) ports 126 and a large o-ring 156 around a raised land 158 on the inside of the end cap 122. The pivot pin 142 includes a pair of holes 168 that are approximately 180 degrees apart from one another, and the selector handle 124 includes a similarly-sized hole to receive a conventional fastener 170 to fixedly attach the valve stem 140 to the handle 124. Note that this allows the selector handle 124 to be installed pointed up or pointed down as preferred by the user.

Figure 22:
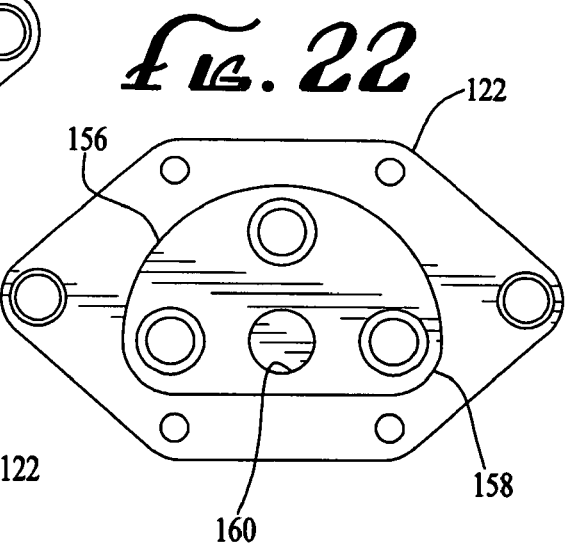
FIG. 22 is an elevation view of the end cap of the second-preferred embodiment.
Figure 23:
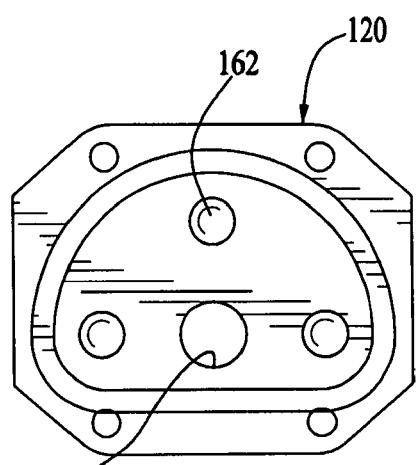
FIG. 23 is an elevation view of the main body or housing of the second-preferred embodiment.

Referring to FIGS. 22, 23 further details and features of the main body or housing 120 and end cap 122 may be described. In the raised land 158 of the end cap 122 is a cylindrical shaped cavity 160 sized to receive the forward end of the pivot pin 142 although allowing a small clearance between. Similarly in the main body or housing 120 is a through hole 161 for the opposing end of the piston pin 142 and its connection with the handle selector handle 124. Inside the main body or housing 120 are a set of three (3) bowl-shaped indentations 162 each sized to receive the ball 150. Referring to FIG. 26, the end cap 122 is machined to include a shoulder 164 in combination with port 126 including a stop 166, such that each port 126 can only be pushed in so far thereby creating a space for encapsulating and retaining the o-ring 156.

Figure 21A:
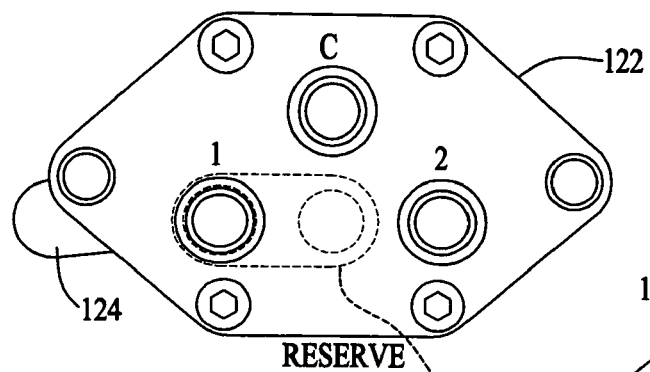
FIG. 21A is an elevation view of the second-preferred embodiment valve in the "ON" position.
Figure 21B:
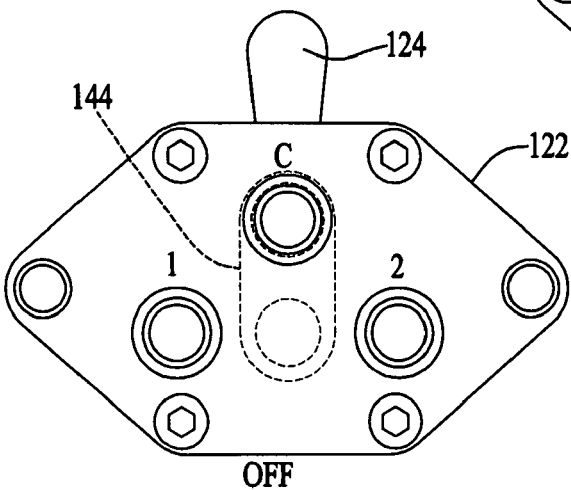
FIG. 21B is an elevation view of the second-preferred embodiment in the "OFF" position.
Figure 21C:
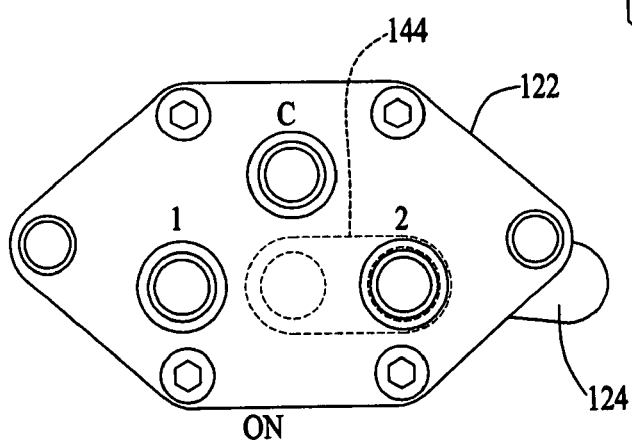
FIG. 21C is an elevation view of the second-preferred embodiment in the "RESERVE" position.

Now also referring to FIGS. 21A-21C and 24-26, the operation, function and use of the valve of the second-preferred embodiment will be discussed. The handle 124 and valve stem or rotor assembly 140 revolve up to approximately 180 degrees inside the main body or housing 120 to one of three (3) positions, Tank 1, Carburetor or Tank 2. When the swing arm 140 is rotated over the Tank 1 port 126 as shown in FIG. 21A, the ball 150 seats against the o-ring 154 thereby preventing fuel from flowing in from the Tank 1 (see also FIGS. 25, 26) while fuel flows freely from Tank 2 to the Carburetor. The Tank 1 port 126 may be connected by a flexible hose (not shown) to the main portion of the gas tank (usually called the "on" position) while the Tank 2 port 126 may be connected to the bottom or reserve portion of the tank (called the "reserve" position), or vice versa, while the "C" port 126 is connected to the carburetor. Similarly, when the handle 124 and swing arm 144 are rotated over the Carburetor or Tank 2 ports 126 (FIGS. 21B, C), those ports 126 are closed and fuel flows between the other two open ports 126.

On the other side of the arm 144 is a second ball 150 that sits between the compression spring 148 and the inside surface of the main body or housing 120. As the handle 124 and valve stem 140 are rotated between the three positions described above, this other ball 150 travels between the three bowl-shaped indentations 162. When the swing arm 144 is positioned over one of the ports, 126, the compression spring 148 causes the ball 150 to jump into the indention 162 and lodge itself therein and create a "click" action (see FIG. 25). This indicates to the user that the handle 124 is properly positioned at one of the three positions, and tends to keep the handle 124 at that position until sufficient force is applied to turn the selector handle 124 and force the ball 150 out of the indention 162 (along with the other ball 150 out of its seat on the o-ring 154 in the port 126) and back inside the swing arm 144. Additionally, the main body or housing 120 is configured such that at the tank 1 and tank 2 positions (FIGS. 21A, 211C) movement in only one direction is possible, so the user knows moving the selector handle 124 all the way one way is the "on" position while moving it all the way the opposite way is the "reserve" position.

The pair of holes 136 in the end cap 122 are mounting means for conventional fasteners for securing the petcock assembly to a motorcycle frame (not shown). The petcock assembly is installed below the gas tank and above the carburetor, as the fuel system is gravity fed, and preferably with the two inlet ports above the single outlet port.

Referring to FIGS. 27-32, the third-preferred embodiments of the present invention will be described. First primarily referring to FIGS. 27-29, the present embodiment petcock valve includes a main body or housing 210, a selector handle 212, a pair of swivel inlet sections 214 and a fixed outlet section 216, each of which are sized to accept a conventional fuel hose or line (not shown). The housing 210 includes four (4) threaded holes 218 sized to receive fasteners (not shown) to mount the housing 210 against a plate-like structure (also not shown) on the motorcycle or other vehicle. The housing 210 includes two (2) other smaller, tooling holes 220 used only in machining the housing 210. Note the slots 222 in the side of the housing 210 and large opening 223 in the bottom which facilitate access to the inside and the components therein for cleaning and maintenance purposes.

Figure 30:
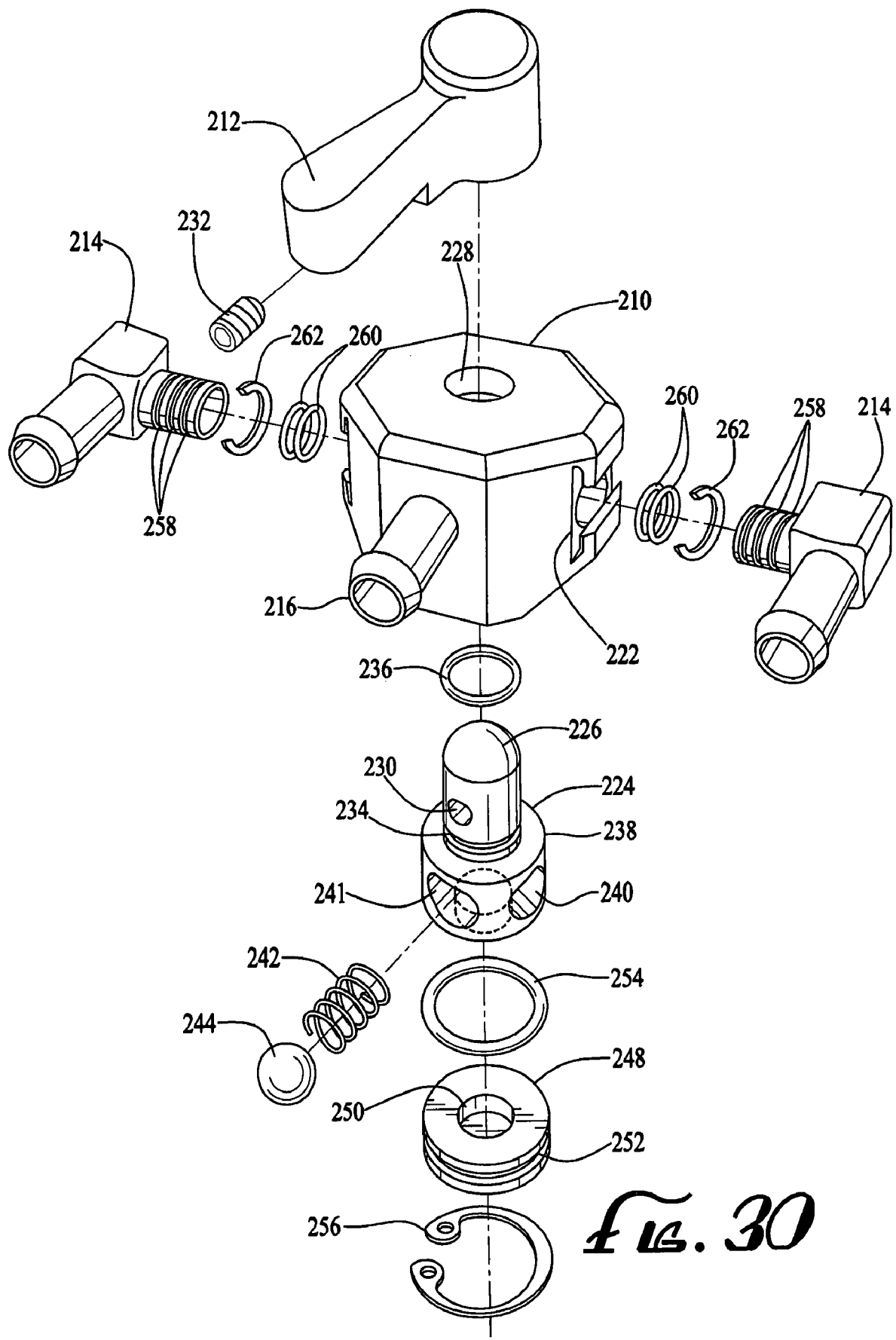
FIG. 30 is an exploded, disassembled view of the parts and components of the third-preferred embodiment valve.
Figure 31:
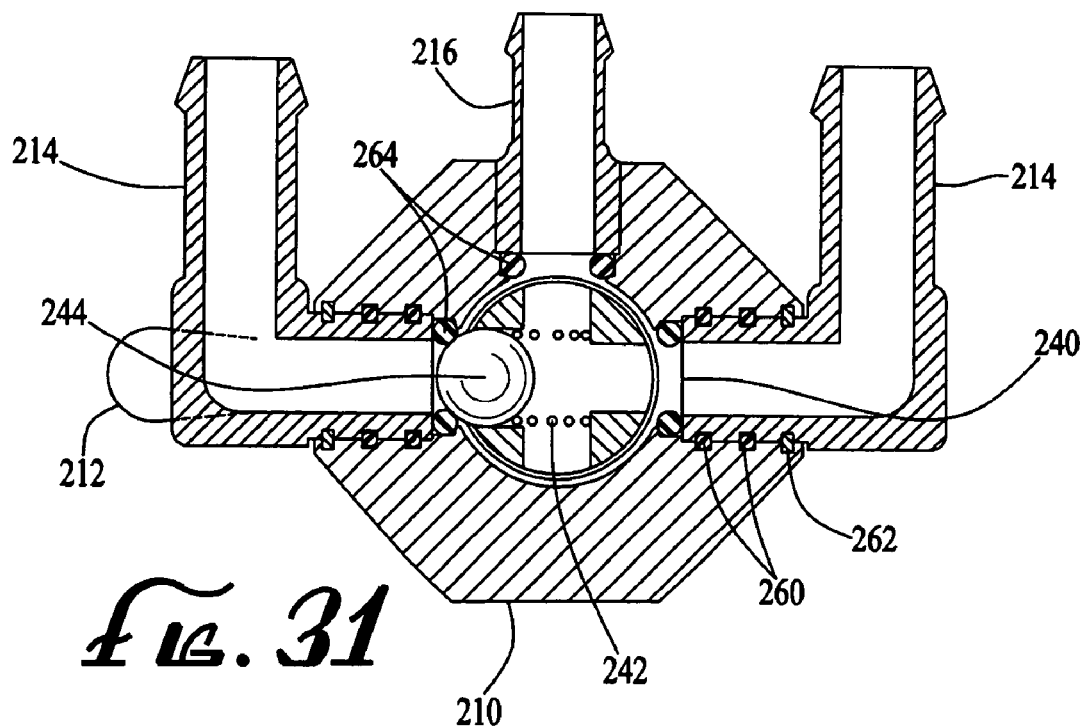
FIG. 31 is a cross-sectional view through the third-preferred embodiment valve in the "ON" position.
Figure 32:
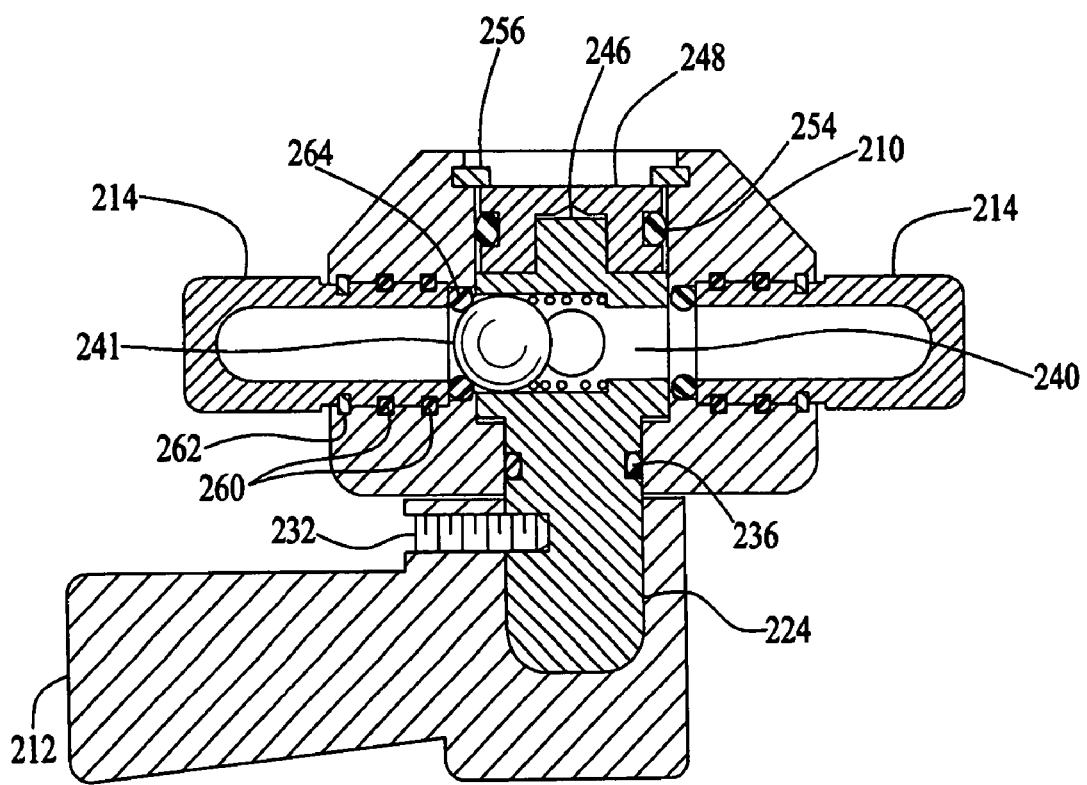
FIG. 32 is another cross-sectional view through the third-preferred embodiment in the "ON" position.

Now also referring to FIGS. 30-32, the parts and components inside the housing 210 may be described. A rotary piston 224 includes a top or neck portion 226 that interfaces with the selector handle 212 through a hole 228 in the housing 210, and a fastener hole 230 is sized to receive a fastener 232 to secure the rotary piston 224 and selector handle 212 together. Upon assembly to prevent any fuel from leaking through the hole 228 in the housing 210, the rotary piston 224 has a circumferential groove 234 sized to accept an o-ring 236. A middle portion 238 of the rotary piston 224 has two orthogonal through bores that create three (3) ports 240 and a fourth port 241 (which correspond to ports in the main body or housing 210 that lead to the inlet 14 and outlet 16 sections). The port 241 aligned with the handle 224 is made a slightly larger diameter to accept a small spring 242 and a ball 244.

On the bottom of the rotary piston 224 is a pivot pin 246, and beneath the rotary piston 224 is an end cap 248 with a cavity 250 sized to accept the pivot pin 246. The end cap 248 has a circumferential groove 252 sized to accept an o-ring 254 that prevents fuel from leaking out the bottom opening 223 in the housing 210. A locking ring 256 is used to secure the end cap 248 inside the housing 210. Each of the inlet sections 214 has three (3) circumferential groves 258, two of which are for o-rings 260 that prevent fuel from leaking out the side of the housing 210, and the last groove 258 for a lock ring 262 that retains the inlet section 214 inside the housing 210, although the inlet sections 214 are still freely able to pivot (360 degrees) to any desired position. There are three (3) additional o-rings 264 in small steps in the housing 210 adjacent the interface with the inlet 214 and outlet 216 sections. The outlet section 214 is preferably an interference press fit and permanently set into the housing 210.

Having described the structure of the third-preferred embodiment, it is now possible to discuss its operation, function and use. The valve of the third-preferred embodiment is configured for the main body or housing 210 to be mounted to a generally flat, plate-like structure and secured with conventional fasteners (not shown) through the four (4) mounting holes 218, and conventional hoses or fuel lines from a the gas or reserve tank or other fuel sources are attached to the inlet sections 214. Advantageously, the inlet sections 214 can freely pivot 360 degrees all the way around, providing great flexibility in the routing of the hoses or fuel lines thereto. That is, the inlet sections 214 can be positioned pointing forward as shown in the FIGS. 27-32, or alternatively can individually or both be pivoted to point downward, backward, upward or anywhere in between, while being retained by the lock rings 262.

With the selector handle 212 in the position aligned with the outlet section 216, the ball 244 is seated against the o-ring 264 in the step in the housing 210 adjacent the outlet section 216 and thus no fuel can flow through the outlet section 216 and to the carburetor or other destination (not shown) for the fuel. With the selector handle 212 aligned over either of the inlet sections 214, the ball 244 similarly closes that inlet section 214 and allows fuel to flow only through the other inlet section and the rotary piston 224 and the outlet section 216. With the ball 244 seated in any of the inlet 214 or outlet 216 section, as the user begins to turn the handle 212 this tends to force the ball 244 (compressing the spring 242) inside the rotary piston 224, and when it reaches the desired inlet 214 or outlet section 216 the ball 244 jumps (the spring 242 is released from a compressed state) into the seat provided by the o-ring 264. This makes a clicking sound and is positive engagement of the selector handle 212 and valve in the new position, and the selector handle 212 and valve tend to stay in that position until forcibly moved to another position.

Disassembling of the third-preferred embodiment for cleaning, replacement of o-rings 236, 254, 260 or 264, or the like is easily accomplished. The lock rings 256 or 262 are removable to gain access inside the housing 210 to every part and component of the petcock valve, and then merely reversing one's steps to reassemble the valve. Preferably in disassembling either of the inlet sections 214, the selector handle 212 should be in the "OFF" position aligned with the outlet section 216, such that the ball 244 will not be propelled out of the housing 210 and possibly lost.

Finally, referring to FIGS. 33-39, the fourth-preferred embodiment may be described. Initially primarily referring to FIGS. 33, 34, this valve has a main body or housing 310 defining a chamber or inner cavity 312 (see FIG. 36), and a pair of swiveling inlet sections 314, 315 and a fixed outlet section 316. On the ends of the inlet sections 314 and outlet section 316 are nipples 318 for connecting conventional fuel hoses (not shown). A selector or lever handle 320 connects to the inner workings of the valve, and an end cover 322 closes out the valve and also serves to provide an interface for a two-fastener mount to a flat surface (not shown).

Figure 36:
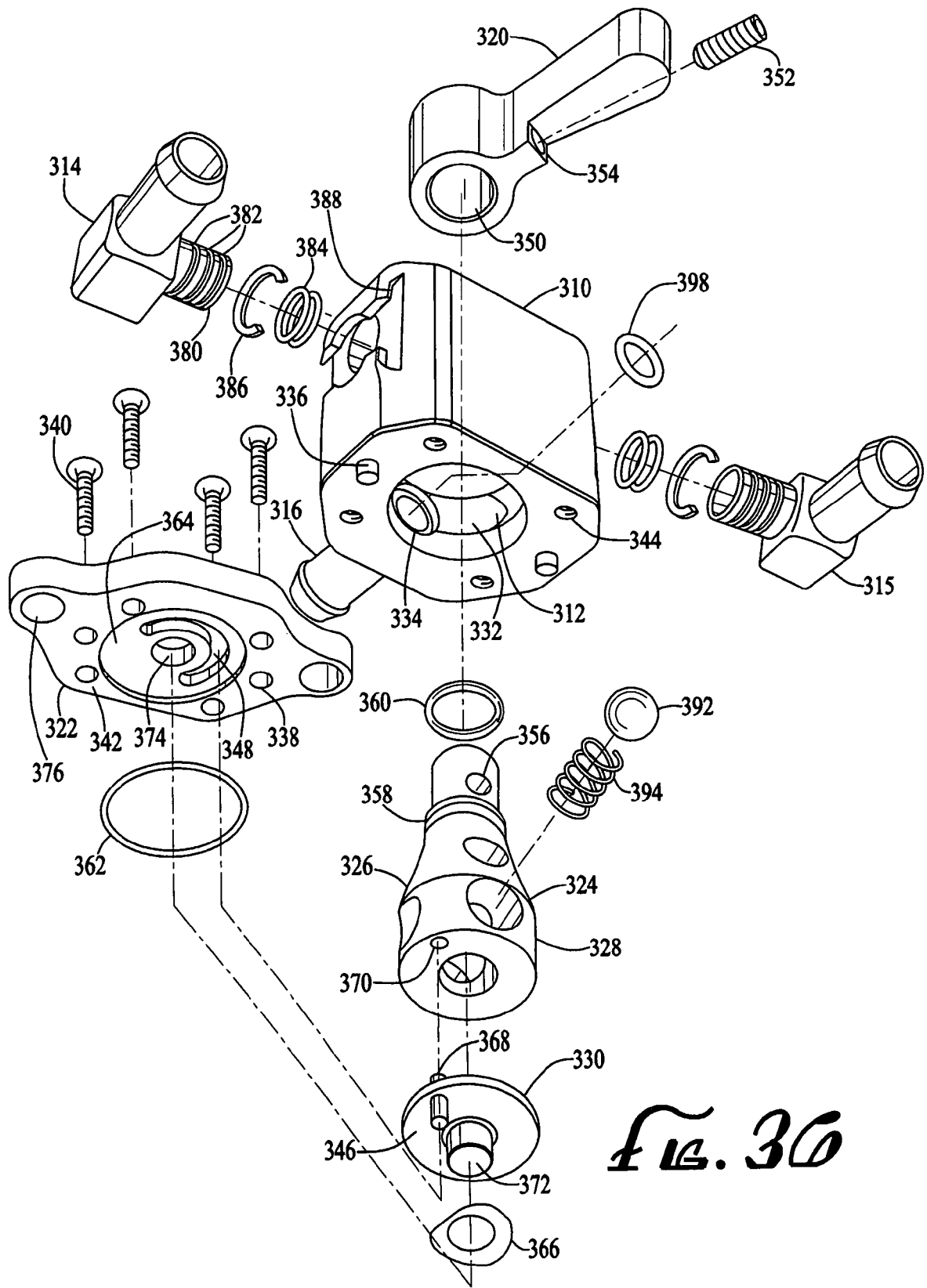
FIG. 36 is an exploded, disassembled bottom perspective view of the fourth embodiment.

As best shown in FIG. 36, housed inside the chamber 312 is a two-stage rotor 324 having an upper portion 326 and a lower portion 328 and a rotor cap 330. The inside of the chamber 312 also has a circumferential groove 332 between one or more seats 334, the function of which is explained below. The bottom side of the main body 310 has a pair of protruding pins 336 and the interfacing side of the end cover 322 has a pair of corresponding holes 338 for mating these two parts together. The main body 310 and end cover 322 are secured together by four conventional fasteners 340 through the holes 342, 344. The rotor cap 330 has a protruding stop 346 that rides in the slot 348 in the end cover 322.

Figure 38:
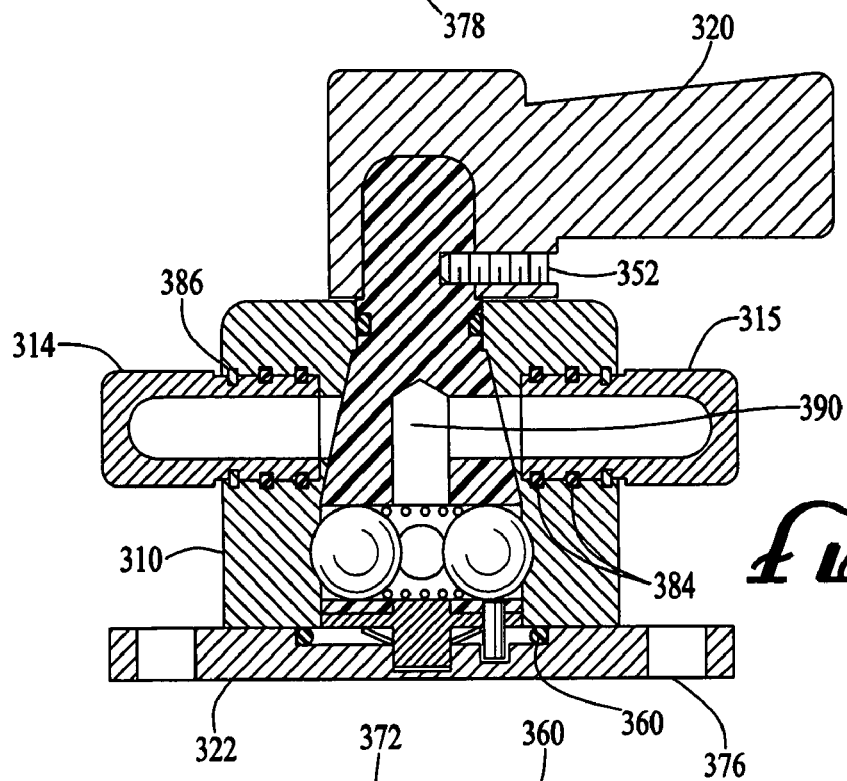
FIG. 38 is another cross-sectional view through the fourth embodiment in the open or on position for the inlet section 315.
Figure 39:
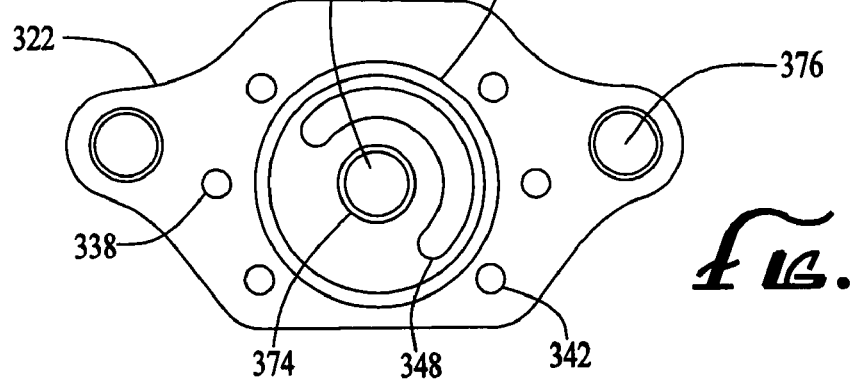
FIG. 39 is a top view of the end cover portion of fourth embodiment.

Continuing to refer to FIG. 36 and also FIGS. 38, 39, the top of the rotor 324 extends through an opening in the main body 310 and into an opening 350 in the selector handle 320, and is fixedly connected to the handle 320 by a conventional fastener 352 through threaded holes 354 and 356. A circumferential groove 358 in the rotor 324 houses an o-ring 360 to seal the top portion of the valve body 310.

Sealing the bottom of the main body 310 is a second o-ring 362 that rides around the perimeter of a recessed area 364 in the end cover 322. In that recessed area 364 there is also a spring washer 366 that maintains a sliding gap between the revolving rotor 324 and rotor cap 330 and fixed end cover 322. A second protruding pin 368 and corresponding hole 370 are for tying the rotor 324 and rotor cap 330 so they revolve together. The rotor end cap 330 also includes a pivot pin 372 that rides in an opening 374 in the end cover 322, and as shown in FIG. 6 the pivot pin 372 extends on the upward side of the rotor cap 33 as well to fill the opening in the bottom of the rotor 324. Finally, the end cover 322 includes a pair of holes 386 for mounting to a flat surface (not shown).

The side portions of the main body 310 include a stepped hole 378 sized to accept a tubular portion 380 of the inlet sections 314, 315. On the tubular portion 380 are a pair of circumferential grooves 382 for a pair of o-rings 384, and a third circumferential groove 382 for a locking ring 386 that slides into a slot 388 in the side of the valve body 310. This configuration and assembly secures the inlet sections 314, 315 and seals the sides of the main body 310 while still allowing the inlet sections 314, 315 to freely swivel in either direction. FIG. 36 shows the inlet sections 314, 315 swiveled to align with the outlet section, whereas FIGS. 33, 34 show the inlet sections 314, 315 swiveled to the opposite direction as the outlet section 316.

Figure 37:
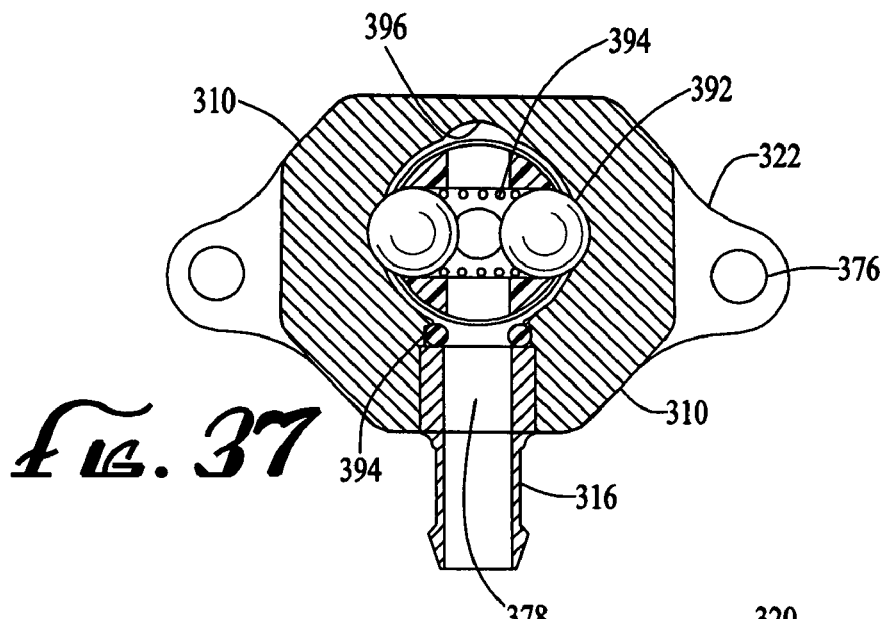
FIG. 37 is a cross-sectional view through the fourth embodiment valve in an open or on position.

Now also referring to FIG. 37, the inner workings of the valve can be described. The rotor 324 is in the approximate shape of a bowling pin and revolves inside the chamber 312 of the main body 310. Inside the rotor 324 is a passageway 390 including a pair of intersecting horizontal through holes in the lower portion 328, a vertical hole through the bottom extending upwards past the intersecting through holes to a horizontal exit hole in the upper portion 326 of the rotor. A pair of balls 392 separated by a compression spring 394 and mounted in the lower portion 328 through hole that aligns with the through hole in the upper portion 326. A curved vertical slot 396 is machined into the interior circumferential grove at three places. Where the outlet section 316 meets the main body 310 a space is created to retain an o-ring 398. See FIG. 14 for an enlarged view of this same valve seat structure found in the first embodiment.

The fourth embodiment operates as follows. The valve is mounted to a flat surface remote from the fuel supply and carburetor (all not shown), and fuel hoses (not shown) are connected to the valve. The inlet sections 314, 315 freely swivel (FIGS. 33-35) offering flexibility in routing of the fuel lines. When the selector handle 320 is in the "off" or middle position the balls 392 are seated against the o-ring 394 and in the vertical slot 396 180 degrees opposite, and the outlet section 316 is sealed and no fuel is able to pass through the valve. Also while in the "off" position, the rotor 324 is oriented such that the hole in the upper portion 326 of the passageway 390 is misaligned with the inlet sections 314, 315 such that no significant amount of fuel is able to pass into the valve from either of the inlet sections 314, 315.

When the selector handle 320 is rotated 90 degrees counter-clockwise (looking down at the top of the valve), the rotor 324 revolves 90 degrees in the same direction, moving the ball out of the seat and away from the o-ring 398 and the upper portion 326 now being oriented such that the hole aligns with the inlet section 315 (see, FIG. 38). Fuel is able to flow readily into the inlet section 315, through the passageway 390 and out the outlet section 316. If the handle is now rotated 180 degrees clockwise (not shown), fuel is able to enter through the other inlet section 314 and pass though the outlet section 316. The valve is configured such that there is a hard stop at the two open or "on" positions, and a detent to indicate and hold the rotor/handle at the midway "off position."

The fourth embodiment valve is also easily disassembled for maintenance purposes. The hoses (not shown) would be disconnected and the valve removed from the mounting surface (not shown). The inlet sections 314, 315 are easily removable by sliding out the locking ring 396. After the bottom fasteners 350 and end cover 322 are removed, as well as the handle fastener 352 and selector handle 320, then the rotor cap 330 and rotor 324, balls 392 and spring 394 can be removed from inside the body 310. When removing the rotor 324 from inside the body 310, one should put his or her hand around the rotor 324 to catch and avoid losing the loose balls 392 AND SPRING 394. This provides access to replace all the o-rings, e.g. 360, 362, 398, etc. as well as for cleaning of the rotor 324 and chamber 312 inside the body 320. Merely reversing these steps will reassemble the valve.

While the present invention has been described with regards to particular embodiments, it is recognized that additional variations of the present invention may be devised without departing from the inventive concept.

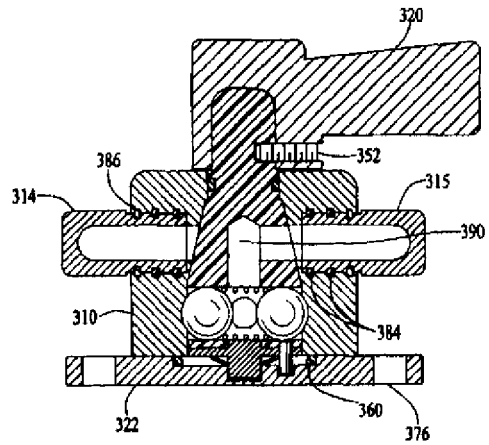

What is claimed is:

1. A multi-mode, fluid control valve comprising:
   a. a main body defining an enclosed chamber having a plurality of inlet ports and an outlet port, the outlet port having an associated seat in the chamber;
   b. a revolving rotor disposed inside the chamber and connected to a selector handle located outside the chamber, the rotor configured to alternately provide a possible passageway between each of the inlet ports and the outlet port;
   c. at least two balls positioned in the rotor and sized to lodge in the seat in the chamber such that the passageway is cut off from at least one of the inlet ports;
   d. a compression spring bearing against the at least two balls and adapted to maintain at least one of the balls lodged in the seat;
   e. wherein the chamber has a circumferential groove in which the balls travel as being revolved between the outlet port and associated seat; and
   f. whereby rotation of the selector handle causes the rotor and the at least two balls and spring to revolve inside the chamber, thereby controlling the fluid flow between the plurality of inlet ports and the outlet port.

2. The multi-mode, fluid control valve of claim 1, wherein the main body has a plurality of detents such that a substantial force is required to rotate the selector handle and revolve the rotor inside the chamber and move the at least two balls between the seats.

3. The multi-mode, fluid control valve of claim 1, wherein the revolving rotor has a lower passageway for accepting fluid from the inlet ports, the passageway extending to an upper passageway for passing fluid through the outlet port.

4. The multi-mode, fluid control valve of claim 1, wherein the revolving rotor is made of metallic material.

5. The multi-mode, fluid control valve of claim 1, wherein a portion of the main body is substantially planar and includes mounting means for securing the valve to a flat surface.

6. The multi-mode, fluid control valve of claim 1, wherein the main body has a removable end cap for gaining access into the chamber.

7. The multi-mode, fluid control valve of claim 1, further comprising a plurality of o-rings disposed in the seats in the chamber to provide leak-proof seals.

8. The multi-mode, fluid control valve of claim 1, wherein the revolving rotor has a protruding stop that rides in a semi-circular slot in the main body such that the handle can rotate a maximum 180 degrees.

* * * * *

UNITED STATES PATENT AND TRADEMARK OFFICE
CERTIFICATE OF CORRECTION

PATENT NO. : 7,559,339 B2
APPLICATION NO. : 11/974955
DATED : July 14, 2009
INVENTOR(S) : Golan et al.

It is certified that error appears in the above-identified patent and that said Letters Patent is hereby corrected as shown below:

The title page, showing an illustrative figure, should be deleted and substitute therefor the attached title page Signed and Sealed this Sixth Day of October, 2009

David J. Kappos
*Director of the United States Patent and Trademark Office*

(12) United States Patent
Golan et al.

(10) Patent No.: US 7,559,339 B2
(45) Date of Patent: Jul. 14, 2009

(54) SELECTOR FUEL VALVE

(76) Inventors: Ilan Z. Golan, 16003 Broadway, Gardena, CA (US) 90248; Daniel Cohen, 16003 Broadway, Gardena, CA (US) 90248

(*) Notice: Subject to any disclaimer, the term of this patent is extended or adjusted under 35 U.S.C. 154(b) by 0 days.

(21) Appl. No.: 11/974,955

(22) Filed: Oct. 17, 2007

(65) Prior Publication Data
US 2008/0041470 A1 Feb. 21, 2008

Related U.S. Application Data

(62) Division of application No. 11/173,047, filed on Jul. 1, 2005, now Pat. No. 7,299,824.

(60) Provisional application No. 60/585,190, filed on Jul. 1, 2004, provisional application No. 60/602,426, filed on Aug. 17, 2004, provisional application No. 60/662,153, filed on Mar. 15, 2005.

(51) Int. Cl.
 *F16K 11/08* (2006.01)
(52) U.S. Cl. .................. 137/625.41; 251/287
(58) Field of Classification Search .......... 137/625.41, 137/625.46, 614.18, 864, 901; 251/180, 251/181, 182, 185, 287
See application file for complete search history.

(56) References Cited

U.S. PATENT DOCUMENTS

| | | | |
|---|---|---|---|
| 1,992,319 A | 2/1935 | Maggenti | |
| 2,075,458 A | 3/1937 | Parker | |
| 2,209,132 A | 7/1940 | Parker | |
| 2,314,512 A | 3/1943 | Parker | |
| 2,494,633 A * | 1/1950 | Schlicksupp | 137/864 |
| 2,598,605 A | 5/1952 | Robinson | |
| 2,980,142 A * | 4/1961 | Turak | 137/637.3 |
| 3,406,943 A * | 10/1968 | Newell | 251/163 |
| 4,072,291 A | 2/1978 | Adams | |
| 4,250,921 A | 2/1981 | Pingel et al. | |
| 4,275,823 A | 6/1981 | Credle, Jr. | |
| 4,890,644 A | 1/1990 | Hoeptner, III et al. | |
| 4,957,138 A | 9/1990 | Pingel et al. | |
| 5,115,837 A | 5/1992 | Tupper | |

(Continued)

*Primary Examiner*—John Fox
(74) *Attorney, Agent, or Firm*—Robert J. Lauson; Lauson & Tarver LLP

(57) ABSTRACT

A multi-position fuel valve includes a main body having an enclosed chamber with a number of inlet ports and an outlet port and associated seats in the chamber. Disposed inside the chamber is a revolving rotor that is connected to a selector handle located outside the chamber. The rotor provides a possible passageway between each of the inlet ports and the outlet port. The handle can rotate a maximum 180 degrees, and the valve has a pair of inlet sections and three-positions with an "off" position approximately midway between the other two positions. A pair of balls are positioned in the rotor and lodge in the plurality of seats or elsewhere in the chamber. When this occurs a certain portion of the passageway is cut off meaning there is no fluid flow from at least one of inlet ports through the outlet port. A compression spring with opposing ends bearing against the balls maintains the balls lodged in the seats, and releasably fixes the position of the rotor and handle. The valve further has a number of swiveling extension sections connected to the ports for inlet or outlet hoses, such that the valve can be mounted remote from the fuel supply and/or carburetor and connecting hosed routed in most any direction.

8 Claims, 15 Drawing Sheets